(12) United States Patent
Rodriguez et al.

(10) Patent No.: US 11,872,590 B2
(45) Date of Patent: Jan. 16, 2024

(54) METHODS FOR FABRICATING TRANSPARENT ICEPHOBIC COATINGS, AND TRANSPARENT ICEPHOBIC COATINGS OBTAINED THEREFROM

(71) Applicant: HRL Laboratories, LLC, Malibu, CA (US)

(72) Inventors: April R. Rodriguez, Santa Monica, CA (US); Andrew P. Nowak, Los Angeles, CA (US); Adam F. Gross, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 96 days.

(21) Appl. No.: 17/524,054

(22) Filed: Nov. 11, 2021

(65) Prior Publication Data

US 2022/0097097 A1    Mar. 31, 2022

Related U.S. Application Data

(60) Division of application No. 16/173,255, filed on Oct. 29, 2018, now Pat. No. 11,247,228, which is a
(Continued)

(51) Int. Cl.
*C09D 175/00* (2006.01)
*B05D 3/00* (2006.01)
(Continued)

(52) U.S. Cl.
CPC .............. *B05D 3/007* (2013.01); *C08G 18/10* (2013.01); *C08G 18/246* (2013.01);
(Continued)

(58) Field of Classification Search
CPC .......... B05D 3/007; B05D 1/06; B05D 5/083; C09D 5/00
See application file for complete search history.

(56) References Cited

U.S. PATENT DOCUMENTS 3,435,003 A    3/1969 Craven
3,810,874 A    5/1974 Mitsch et al.
(Continued)

FOREIGN PATENT DOCUMENTS

EP    1558661 B1    12/2012
WO    1997035919 A1    10/1997
WO    2013158360 A1    10/2013

OTHER PUBLICATIONS

Ashish Vaidya and Manoj K. Chaudhury, "Synthesis and Surface Properties of Environmentally Responsive Segmented Polyurethanes," Journal of Colloid and Interface Science 249, 235-245 (2002).
(Continued)

*Primary Examiner* — Michael L Leonard
(74) *Attorney, Agent, or Firm* — O'Connor & Company; Ryan P. O'Connor

(57) ABSTRACT

Some variations provide a method of forming a transparent icephobic coating, comprising: obtaining a hardenable precursor comprising a first component and a plurality of inclusions containing a second component, wherein one of the first component or the second component is a low-surface-energy polymer, and the other is a hygroscopic material; applying mechanical shear and/or sonication to the hardenable precursor; disposing the hardenable precursor onto a substrate; and curing the hardenable precursor to form a transparent icephobic coating. The coating contains a hardened continuous matrix containing regions of the first component separated from regions of the second component on an average length scale of phase inhomogeneity from 10 nanometers to 10 microns, such as less than 1 micron, or less than 100 nanometers. The transparent icephobic coating may be characterized by a light transmittance of at least 50%
(Continued)

at wavelengths from 400 nm to 800 nm, through a 100-micron coating.

**12 Claims, 15 Drawing Sheets
(8 of 15 Drawing Sheet(s) Filed in Color)**

Related U.S. Application Data continuation-in-part of application No. 15/608,975, filed on May 30, 2017, now Pat. No. 10,619,057, which is a continuation-in-part of application No. 14/829,640, filed on Aug. 19, 2015, now Pat. No. 10,125,227.

(60) Provisional application No. 62/643,838, filed on Mar. 16, 2018, provisional application No. 62/345,250, filed on Jun. 3, 2016, provisional application No. 62/038,878, filed on Aug. 19, 2014.

(51) Int. Cl.
*C08G 18/10* (2006.01)
*C08G 18/50* (2006.01)
*C08G 18/48* (2006.01)
*C08G 81/02* (2006.01)
*C09D 175/08* (2006.01)
*C08G 18/24* (2006.01)
*C08G 18/75* (2006.01)
*C08G 81/00* (2006.01)
*C09D 5/00* (2006.01)
*B05D 5/08* (2006.01)
*B05D 1/06* (2006.01)

(52) U.S. Cl.
CPC ..... *C08G 18/4804* (2013.01); *C08G 18/4833* (2013.01); *C08G 18/5015* (2013.01); *C08G 18/758* (2013.01); *C08G 81/00* (2013.01); *C08G 81/025* (2013.01); *C09D 5/00* (2013.01); *C09D 175/08* (2013.01); *B05D 1/06* (2013.01); *B05D 5/083* (2013.01); *B05D 2401/31* (2013.01); *B05D 2506/15* (2013.01); *B05D 2508/00* (2013.01); *B05D 2518/00* (2013.01)

(56) References Cited

U.S. PATENT DOCUMENTS

| | | |
|---|---|---|
| 3,847,978 A | 11/1974 | Sianesi et al. |
| 4,777,224 A | 10/1988 | Gorzynski et al. |
| 4,956,438 A | 9/1990 | Ruetman et al. |
| 5,032,666 A | 7/1991 | Hu et al. |
| 5,084,315 A | 1/1992 | Karimi et al. |
| 5,189,135 A | 2/1993 | Cozzi et al. |
| 5,290,418 A | 3/1994 | Menchen et al. |
| 5,332,798 A | 7/1994 | Ferreri et al. |
| 5,589,552 A | 12/1996 | Simeone et al. |
| 5,798,415 A | 8/1998 | Corpart et al. |
| 6,071,564 A | 6/2000 | Marchetti et al. |
| 6,579,835 B2 | 6/2003 | Scicchitano et al. |
| 6,926,937 B2 | 8/2005 | Extrand et al. |
| 6,992,132 B2 | 1/2006 | Trombetta et al. |
| 7,655,310 B2 | 2/2010 | Trombetta |
| 9,136,562 B2 | 9/2015 | Singh et al. |
| 2002/0016267 A1 | 2/2002 | Scicchitano et al. |
| 2003/0229176 A1 | 12/2003 | Trombetta et al. |
| 2004/0019143 A1 | 1/2004 | Koloski et al. |
| 2005/0164010 A1 | 7/2005 | Trombetta |
| 2006/0189750 A1 | 8/2006 | Maier et al. |
| 2007/0298216 A1 | 12/2007 | Jing et al. |
| 2008/0219944 A1 | 9/2008 | Longo et al. |
| 2010/0324205 A1 | 12/2010 | Maier et al. |
| 2011/0177987 A1 | 7/2011 | Lenting et al. |
| 2011/0218290 A1 | 9/2011 | Webster et al. |
| 2011/0229750 A1 | 9/2011 | McLellan et al. |
| 2011/0213085 A1 | 11/2011 | Tonelli et al. |
| 2012/0136120 A1 | 2/2012 | Bosman |
| 2012/0164565 A1 | 6/2012 | Qiu |
| 2014/0113144 A1 | 4/2014 | Loth et al. |
| 2014/0127516 A1 | 5/2014 | Wang et al. |
| 2014/0162022 A1 | 6/2014 | Nowak et al. |
| 2015/0158969 A1 | 6/2015 | Nowak |
| 2015/0329453 A1 | 11/2015 | Guarda et al. |
| 2016/0028114 A1 | 1/2016 | Pratt et al. |
| 2016/0201005 A1 | 7/2016 | Nowak et al. |

OTHER PUBLICATIONS

Siochi et al., "Engineered Surfaces for Mitigation of Insect Residue Adhesion" NF1676L-15481 Sampe 2013; May 6-9, 2013; Long Beach, CA; United States.
Wohl et al., "Evaluation of commercially available materials to mitigate insect residue adhesion on wing leading edge surfaces," Progress in Organic Coatings 76 (2013) 42-50.
Kok et al., "Influence of surface characteristics on insect residue adhesion to aircraft leading edge surfaces," Progress in Organic Coatings 76 (2013) 1567-1575.
Lee et al., "Zwitter-Wettability and Antifogging Coatings with Frost-Resisting Capabilities," ACS Nano 7 (2013) 2172-2185.
Chen et al., "Robust Prototypical Anti-icing Coatings with a Self-lubricating Liquid Water Layer between Ice and Substrate," ACS Appl. Mater. Interfaces 5 (2013) 4026-4030.
Turri et al., "Waterborne Anionomeric Polyurethane-Ureas from Functionalized Fluoropolyethers," Journal of Applied Polymer Science, vol. 93, 136-144 (2004).
Dou et al., "Anti-icing Coating with an Aqueous Lubricating Layer," ACS Appl. Mater. Interfaces 2014, 6, 6998-7003.
Wang et al., "Investigation of the role of hydrophilic chain length in amphiphilic perfluoropolyether/poly(ethylene glycol) networks: towards high-performance antifouling coatings," Biofouling vol. 27, No. 10, Nov. 2011, 1139-1150.
Chen et al., "A Thermally Re-mendable Cross-Linked Polymeric Material," Science 295 (5560), 1698-1702, Mar. 1, 2002.
Oster et al., "Photoreduction of Metal Ions by Visible Light," Departmenotf Chemistry, Polytechnic Institute of Brooklyn, 135th National meeting of the American Chemical Society, Nov. 5, 1959.
Wojtecki et al., "Using the dynamic bond to access macroscopically responsive structurally dynamic polymers," Nature Materials vol. 10, Jan. 2011.
Castellano et al., "Fluoro-modified elastomeric polyurethanes: effects of synthesis procedure on properties and morphology" J Mater Sci (2014) 49:2519-2533.

METHODS FOR FABRICATING TRANSPARENT ICEPHOBIC COATINGS, AND TRANSPARENT ICEPHOBIC COATINGS OBTAINED THEREFROM

PRIORITY DATA

This patent application is a divisional application of U.S. patent application Ser. No. 16/173,255, filed on Oct. 29, 2018 (now allowed), which (i) claims priority to U.S. Provisional Patent App. No. 62/643,838, filed on Mar. 16, 2018, and (ii) is a continuation-in-part of U.S. Pat. No. 10,619,057, issued on Apr. 14, 2020, which in turn is a continuation-in-part of U.S. Pat. No. 10,125,227, issued on Nov. 13, 2018, each of which is hereby incorporated by reference herein.

FIELD OF THE INVENTION

The present invention generally relates to transparent icephobic coatings, and methods of making transparent icephobic coatings.

BACKGROUND OF THE INVENTION

Coatings and materials can become soiled from debris (particles, insects, oils, etc.) impacting the surface as well as ice forming on the surface. The debris and ice affects airflow over the surface.

In aviation, icing conditions are those atmospheric conditions that can lead to the formation of water ice on the surfaces of an aircraft, or within the engine as carburetor icing. Inlet icing is another engine-related danger, often occurring in jet aircraft. Icing conditions exist when the air contains droplets of supercooled liquid water. The wing will ordinarily stall at a lower angle of attack, and thus a higher airspeed, when contaminated with ice.

If ice is present on an aircraft prior to takeoff, the ice must be removed from critical surfaces. Removal can take many forms, including mechanical means, deicing fluids, hot water, or infrared heating. These techniques may remove existing contamination, but provide no practical protection in airborne icing conditions. Deicing fluids may resist the effects of snow and rain for some time but are intended to shear off the aircraft during takeoff and therefore provide no inflight protection.

To protect an aircraft against icing in-flight, various forms of anti-icing or deicing are used. Some aircraft are equipped with pneumatic deicing boots that disperse ice build-up on the surface. A weeping wing system may be used, with many small holes that release anti-icing fluid on demand to prevent the buildup of ice. Electrical heating may be used to protect aircraft and components (including propellers) against icing. Modern commercial aircraft often employ a hollow tube located behind the leading edge of the wing, through which hot engine bleed air is directed to melt and release ice.

Passive, durable anti-icing coatings have been identified as a need in the aerospace field for many decades. However, previous solutions lacked a required level of performance in ice adhesion reduction, adequate long-term durability, or both of these. Some of the most-effective coatings for reducing ice adhesion are dependent on sacrificial oils or greases that have limited useful lifetimes and require regular reapplication. Currently, durable coatings for exposed areas on fixed wing and rotorcraft (such as the leading edge of the wing or rotorblade) include thermoplastic elastomers bonded to the vehicle surface using a film adhesive or an activated adhesive backing incorporated into the coating itself. However, the prior compositions do not provide any benefit in lowering ice adhesion.

There remains a desire for coatings on aircraft exteriors (and other aerospace-relevant surfaces) in order to passively suppress the growth of ice near strategic points on the vehicle—such as the rotorblade edge, wing leading edge, or engine inlet. There also exists a need for high-performance coating materials fabricated in a way that preserves coating function during actual use of aerospace structures.

Low-ice-adhesion coatings are certainly not limited to aerospace-relevant surfaces. Other potential applications would include wind turbine blades, automobiles, trucks, trains, ocean-going vessels, electrical power transmission lines, buildings, windows, antennas, filters, instruments, sensors, cameras, satellites, weapon systems, and chemical plant infrastructure (e.g., distillation columns and heat exchangers).

Transparent icephobic coatings are desired for many applications requiring durable protective performance or decorative coatings, or where it is desired that the substrate surface be the apparent surface (e.g. on a vehicle). For example, transparent icephobic coatings are useful for incorporating on or in vehicle windows, visual sensors, vehicle external skin, airplanes, automobiles, bridges, buildings, appliances, glass substrates, optically transparent substrates, touchscreens, sportswear and outdoor clothing, sports equipment, outdoor furniture, and industrial or commercial plastic parts.

In view of the shortcomings in the art, transparent icephobic coatings, and methods of making transparent icephobic coatings, are desired.

SUMMARY OF THE INVENTION

The present invention addresses the aforementioned needs in the art, as will now be summarized and then further described in detail below.

Some variations provide a method of forming a transparent icephobic coating, the method comprising:

(a) obtaining a hardenable precursor material for a transparent icephobic coating, the hardenable precursor material comprising a first component and a plurality of inclusions containing a second component, wherein one of the first component or the second component is a low-surface-energy polymer having a surface energy between about 5 mJ/m$^2$ to about 50 mJ/m$^2$, and the other of the first component or the second component is a hygroscopic material;

(b) applying mechanical shear and/or sonication to the hardenable precursor material;

(c) disposing the hardenable precursor material onto a substrate surface; and (d) curing the hardenable precursor material to form a transparent icephobic coating comprising a hardened continuous matrix containing regions of the first component separated from regions of the second component on an average length scale of phase inhomogeneity from about 10 nanometers to about 10 microns.

In some embodiments, step (b) comprises treating the hardenable precursor material with a high-shear apparatus selected from the group consisting of a dispersion disk-type blade, a high-pressure microfluidizer, a centrifugal mixer, and combinations thereof. Alternatively, or additionally, step (b) may comprise treating the hardenable precursor material with a sonication apparatus selected from the group consisting of an ultrasonic bath sonicator, a probe sonicator, sonicator horns, and combinations thereof.

In some methods, steps (b) and (c) are performed simultaneously. For example, the hardenable precursor material may be disposed onto a substrate surface directly from a sonicating bath, in a continuous or semi-continuous manner such that some hardenable precursor material that has already been sonicated is disposed onto the substrate while other hardenable precursor material is still being sonicated.

In some methods, steps (c) and (d) are performed simultaneously. For example, the hardenable precursor material may be subjected to curing conditions at the same time that it is being disposed onto a substrate surface, in a continuous or semi-continuous manner such that some precursor material that has already been applied to the surface is hardened while other hardenable precursor material is still being applied and is not yet hardened.

In some embodiments, the average length scale of phase inhomogeneity is from about 10 nanometers to about 1 micron. In certain embodiments, the average length scale of phase inhomogeneity is from about 10 nanometers to about 100 nanometers, and in some preferred embodiments, is about 50 nanometers or less.

In various embodiments, the transparent icephobic coating is characterized by a light transmittance of at least 20%, at least 50%, or at least 80%, at one or more wavelengths from 400 nm to 800 nm, through a 100-micron film of the transparent icephobic coating.

The low-surface-energy polymer may be a fluoropolymer, such as a perfluoropolyether. The hygroscopic material may be a polyester or polyether, such as poly(ethylene glycol).

Other variations of the invention provide a transparent icephobic coating comprising a first component and a plurality of inclusions containing a second component, wherein one of the first component or the second component is a low-surface-energy polymer having a surface energy between about 5 mJ/m² to about 50 mJ/m², wherein the other of the first component or the second component is a hygroscopic material, wherein the transparent icephobic coating has a microstructure characterized by regions of the first component separated from regions of the second component on an average length scale of phase inhomogeneity from about 10 nanometers to about 10 microns, and wherein the transparent icephobic coating is characterized by a light transmittance of at least 50%, at one or more wavelengths from 400 nm to 800 nm, through a 100-micron film of the transparent icephobic coating.

In some embodiments, the average length scale of phase inhomogeneity is from about 10 nanometers to about 1 micron, such as from about 10 nanometers to about 100 nanometers.

In some embodiments, the low-surface-energy polymer is a fluoropolymer. The fluoropolymer may be present in the transparent icephobic coating at a concentration from about 5 wt % to about 50 wt %, such as from about 15 wt % to about 35 wt %. The fluoropolymer may be selected from the group consisting of polyfluoroethers, perfluoropolyethers, polyfluoroacrylates, polyfluorosiloxanes, polytetrafluoroethylene, polyvinylidene difluoride, polyvinylfluoride, polychlorotrifluoroethylene, copolymers of ethylene and trifluoroethylene, copolymers of ethylene and chlorotrifluoroethylene, and combinations thereof.

In certain embodiments, the fluoropolymer is a perfluoropolyether, which may have an average molecule weight of about 500 g/mol to about 10,000 g/mol. In some preferred embodiments, the perfluoropolyether has an average molecule weight of about 500 g/mol to about 3,000 g/mol.

In some embodiments, the hygroscopic material is a polyester or polyether, such as poly(ethylene glycol). The poly(ethylene glycol) may have an average molecule weight of about 100 g/mol to about 5,000 g/mol. In some preferred embodiments, the poly(ethylene glycol) has an average molecule weight of about 100 g/mol to about 2,000 g/mol.

The low-surface-energy polymer and the hygroscopic material may be present in a segmented copolymer. For example, the segmented copolymer may comprise:

(a) one or more first soft segments selected from fluoropolymers having an average molecular weight from about 500 g/mol to about 10,000 g/mol, wherein the fluoropolymers are $(\alpha,\omega)$-hydroxyl-terminated and/or $(\alpha,\omega)$-amine-terminated;

(b) one or more second soft segments selected from polyesters or polyethers having an average molecular weight from about 100 g/mol to about 5,000 g/mol, wherein the polyesters or polyethers are $(\alpha,\omega)$-hydroxyl-terminated and/or $(\alpha,\omega)$-amine-terminated;

(c) in one or more hard segments, a reacted form of one or more isocyanate species possessing an isocyanate functionality of 2 or greater; and (d) in the one or more hard segments, a reacted form of one or more polyol or polyamine chain extenders or crosslinkers.

In the segmented copolymer, the average length scale of phase inhomogeneity is a length scale between the first soft segments and the second soft segments. Separately, the microstructure may be further characterized in that the hard segments are separated from the first soft segments and/or the second soft segments on an average nanophase-separation length scale from about 5 nanometers to about 100 nanometers.

The transparent icephobic coating may be characterized by a light transmittance of at least 55%, 60%, 65%, 70%, 75%, 80%, 85%, or 90%, at one or more wavelengths from 400 nm to 800 nm, through a 100-micron film of the transparent icephobic coating.

The transparent icephobic coating has a glass-transition temperature above −80° C., in some embodiments.

The icephobic coating is typically disposed on a substrate surface. In some variations, the icephobic coating is formed into a bulk object, with no substrate. At least one surface of the object can be characterized as a coating (e.g., a self-healing coating).

In some embodiments, the transparent icephobic coating is characterized by an AMIL Centrifuge Ice Adhesion Reduction Factor of about 50 or more when subjected to an AMIL Centrifuge Ice Adhesion Test.

BRIEF DESCRIPTION OF THE FIGURES

The patent or application file contains at least one drawing executed in color. Copies of this patent or patent application publication with color drawings will be provided by the Office upon request and payment of the necessary fee.

DETAILED DESCRIPTION OF EMBODIMENTS OF THE INVENTION

Figure 1A:
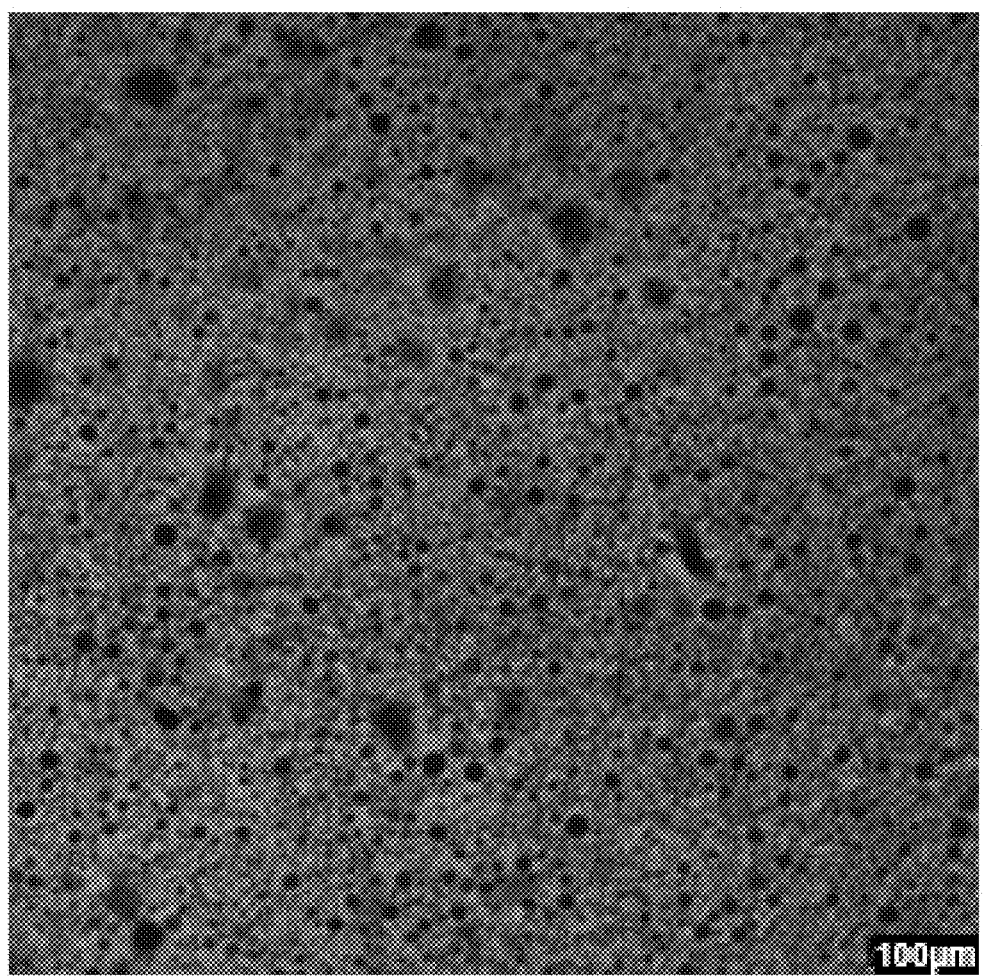
FIG. 1A confocal laser scanning microscopy (CLSM) image (scale bar 100 µm) for the Example 1 coating produced using conventional prepolymer mixing during polymer synthesis.

The materials, structures, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of this invention are premised on the discovery of a material that possesses both low surface energy (for low adhesion) and the ability to absorb water. A structured material or coating, as disclosed, may passively absorb water from the atmosphere and then expel this water to create a lubrication/self-cleaning layer. Because these materials trap a layer of water near the surface, they can delay the formation of ice. The coating in some embodiments may thus be characterized as "icephobic," which is intended to mean the coating is capable of delaying the formation of ice and/or causing a freezing-point depression of ice, compared to a bare substrate. The lubricating component has the ability to trap and organize a layer of water at the surface to both inhibit freezing and reduce adhesion forces in ice that does begin to accumulate on the surface.

In some variations, low-ice-adhesion structures are created by an inhomogeneous microstructure comprising a low-surface-energy polymer that is interspersed with hygroscopic domains (lubricating inclusions). Some embodiments utilize polymeric coating compositions containing at least two phases that microphase-separate microscopic length scales. In some embodiments, the low-ice-adhesion material contains a segmented urethane/urea copolymer composition that includes a fluoropolymer, a polyether, and a polyurethane.

Unless otherwise indicated, all references to "phases" in this patent application are in reference to solid phases. The solid phases are typically polymeric and may melt or at least undergo a glass transition at elevated temperatures. Reference to multiple solid phases in a composition or microstructure means that there are at least two distinct chemical phases that are solid, without forming a solid solution or homogeneous mixture.

In this specification, "ice" should be broadly construed to refer to any possible solid phase of water, solid phase containing water, or multiphase mixtures containing solid water.

In our U.S. Pat. No. 10,619,057, issued on Apr. 14, 2020, and U.S. Pat. No. 10,125,227, issued on Nov. 13, 2018, each of which is incorporated by reference, world-class ice adhesion reduction is demonstrated along with outstanding mechanical toughness. The performance is accomplished through a urethane coating that combines fluoropolymer (perfluoropolyether) and hygroscopic (poly(ethylene glycol), or PEG) components. Because these precursors are not miscible, they tend to separate or demix over time in the uncured resin, similar to oil-and-water emulsions. The synthesis allows these systems to be cured into an inhomogeneous structure at the mesoscale (1-500 μm) with discrete regions of relatively pure fluoropolymer surrounded by a sea of PEG. Ice adhesion performance is dependent on the fluoropolymer to PEG composition ratio; tuning allows for outstanding ice adhesion stresses (<10 kPa).

However, the micron length scale of inhomogeneity between phases creates a coating that strongly scatters visible light, owing to the similarity of light wavelength with the phase dimensions, and the variation in index of refraction of the fluoropolymer versus the PEG domains. These factors inhibit transparency in the visible region. In order to achieve a visually transparent coating in these films, the length scale of the domains is preferably reduced to 10 microns or less, and preferably below the wavelength of visible light (e.g., less than about 400-800 nanometers). In some preferred embodiments, the length scale of the domains is significantly below the wavelength of visible light (i.e., length scale of domains ≤50 nm). The coatings disclosed herein extend the application space into areas that demand visual transparency.

The present invention is therefore predicated, in some variations, on synthesis (composition optimization) and processing techniques to reduce the droplet size in the precursor emulsion, thereby reducing the final length scale of inhomogeneity in the cured film, to achieve improved transparency, while maintaining toughness of the cured film. In some variations, highly translucent or transparent icephobic coatings are provided by utilizing synthesis and processing techniques to reduce droplet size of discrete domains (e.g., 0.05 to 10 microns).

In preferred embodiments, the icephobic precursor resin is subjected to high-energy and/or high-pressure processing and mixing, prior to curing into a coating. Examples of these processing techniques include high-speed mixing, sonication, and microfluidization, as discussed in more detail below. Generally speaking, the high-energy and/or high-pressure processing and mixing may be provided by mechanical shear, sonication, or both of these.

In some embodiments, the composition of the icephobic precursor resin (and thus the final coating composition) is modified to increase compatibility between highly fluorinated polymers and hydrophilic water-absorbing polymers, to increase stabilization of small emulsion droplets after mechanical shear and/or sonication, and prior to the coating cure.

As intended in this patent application, "phase inhomogeneity," "inhomogeneous microstructure," and the like mean that a multiphase microstructure is present in which there are at least two discrete phases that are separated from each other. The two phases may be one discrete solid phase in a continuous solid phase, two co-continuous solid phases, or two discrete solid phases in a third continuous solid phase, for example.

Some variations provide a method of forming a transparent icephobic coating, the method comprising:

(a) obtaining a hardenable precursor material for a transparent icephobic coating, the hardenable precursor material comprising a first component and a plurality of inclusions containing a second component, wherein one of the first component or the second component is a low-surface-energy polymer having a surface energy between about 5 mJ/m$^2$ to about 50 mJ/m$^2$, and the other of the first component or the second component is a hygroscopic material;

(b) applying mechanical shear and/or sonication to the hardenable precursor material;

(c) disposing the hardenable precursor material onto a substrate surface; and (d) curing the hardenable precursor material to form a transparent icephobic coating comprising a hardened continuous matrix containing regions of the first component separated from regions of the second component on an average length scale of phase inhomogeneity from about 10 nanometers to about 10 microns.

In some embodiments, step (b) comprises treating the hardenable precursor material with a high-shear apparatus selected from the group consisting of a dispersion disk-type blade, a high-pressure microfluidizer, a centrifugal mixer, and combinations thereof. Alternatively, or additionally, step (b) may comprise treating the hardenable precursor material with a sonication apparatus selected from the group consisting of an ultrasonic bath sonicator, a probe sonicator, sonicator horns, and combinations thereof.

In some methods, steps (b) and (c) are performed simultaneously. For example, the hardenable precursor material may be disposed onto a substrate surface directly from a sonicating bath, in a continuous or semi-continuous manner such that some hardenable precursor material that has already been sonicated is disposed onto the substrate while other hardenable precursor material is still being sonicated.

In some methods, steps (c) and (d) are performed simultaneously. For example, the hardenable precursor material may be subjected to curing conditions at the same time that it is being disposed onto a substrate surface, in a continuous or semi-continuous manner such that some precursor material that has already been applied to the surface is hardened while other hardenable precursor material is still being applied and is not yet hardened.

In some embodiments, the average length scale of phase inhomogeneity is from about 10 nanometers to about 1 micron. In certain embodiments, the average length scale of phase inhomogeneity is from about 10 nanometers to about 100 nanometers. In various embodiments, the average length scale of phase inhomogeneity is about 10, 20, 30, 40, 50, 60, 70, 80, 90, or 100 nanometers, or about 0.1, 0.2, 0.5, 1, 2, 3, 4, 5, 6, 7, 8, 9, or 10 microns, including any intervening ranges.

The length scale of phase inhomogeneity may refer to the average size of first components and/or the average size of second components. The length scale of phase inhomogeneity may refer to the average center-to-center distance between nearest-neighbor inclusions of the same phase (i.e., first component or second component). When the first component is in the form of discrete inclusions within a continuous matrix of the second component, the length scale of phase inhomogeneity may refer to the average separation distance between nearest-neighbor regions of the discrete phase, i.e. the sizes of the continuous phase (second component) regions.

Exemplary imaging techniques to measure phase separation include, but are not limited to, confocal laser scanning microscopy, scanning electron microscopy, scanning tunneling microscopy, and atomic force microscopy.

In various embodiments, the transparent icephobic coating is characterized by a light transmittance of at least 20%, at least 50%, or at least 80%, at one or more wavelengths from 400 nm to 800 nm, through a 100-micron film of the transparent icephobic coating. Light transmittance of a material is a property of that material that governs the transmission of light through the material. Typical automotive and aerospace coatings are <100 microns thick, so 100 microns is a fair thickness for defining light transmittance herein. Coatings with actual thickness less than 100 microns will usually have higher light transmittance than a 100-micron coating made of the same material. In various embodiments, the transparent icephobic coating is characterized by a light transmittance of at least 50%, 55%, 60%, 65%, 70%, 75%, 80%, 85%, 90%, or 95%, at a wavelength of 400 nm, 500 nm, 600 nm, 700 nm, or 800 nm, through a 100-micron film of the transparent icephobic coating. When the icephobic coating has a light transmittance from 20% to 50% at light wavelengths from 400-800 nm, the coating may be characterized as translucent or partially transparent.

The low-surface-energy polymer may be a fluoropolymer, such as a perfluoropolyether. The hygroscopic material may be a polyester or polyether, such as poly(ethylene glycol).

Other variations of the invention provide a transparent icephobic coating comprising a first component and a plurality of inclusions containing a second component, wherein one of the first component or the second component is a low-surface-energy polymer having a surface energy between about 5 mJ/m$^2$ to about 50 mJ/m$^2$, wherein the other of the first component or the second component is a hygroscopic material, wherein the transparent icephobic coating has a microstructure characterized by regions of the first component separated from regions of the second component on an average length scale of phase inhomogeneity from about 10 nanometers to about 10 microns (or 1 micron, or 100 nanometers), and wherein the transparent icephobic coating is characterized by a light transmittance of at least 50%, at one or more wavelengths from 400 nm to 800 nm, through a 100-micron film of the transparent icephobic coating.

A wide range of concentrations of components may be present in the transparent icephobic coating. For example, a first-material phase may be from about 1 wt % to about 95 wt %, such as from about 10 wt % to about 50 wt % of the composite material. A second-material phase may be from about 1 wt % to about 95 wt %, such as from about 10 wt % to about 50 wt % of the composite material.

Within the component containing the first-material phase, the first-material phase may be from about 50 wt % to 100 wt %, such as about 60, 70, 80, 90, 95, or 100 wt %. Within the component containing the second-material phase, the second-material phase may be from about 50 wt % to 100 wt %, such as about 60, 70, 80, 90, 95, or 100 wt %.

In some embodiments, the low-surface-energy polymer is a fluoropolymer. The fluoropolymer may be present in the transparent icephobic coating at a concentration from about 5 wt % to about 50 wt %, such as from about 15 wt % to about 35 wt %.

The fluoropolymer may be selected from the group consisting of polyfluoroethers, perfluoropolyethers, polyfluoroacrylates, polyfluorosiloxanes, polytetrafluoroethylene, polyvinylidene difluoride, polyvinylfluoride, polychlorotrifluoroethylene, copolymers of ethylene and trifluoroethylene, copolymers of ethylene and chlorotrifluoroethylene, and combinations thereof.

In certain embodiments, the fluoropolymer is a perfluoropolyether, which may have an average molecule weight of about 500 g/mol to about 10,000 g/mol. All molecular weights stated herein are number-average molecular weights ($M_n$). In some preferred embodiments, the perfluoropolyether has an average molecule weight of about 500 g/mol to about 3,000 g/mol. The perfluoropolyether may have an average molecular weight of about 1,000, 1,500, 2,000, 2,500, 3,000, 4,000, 5,000, 7,500, or 10,000 g/mol, for example.

In some embodiments, the hygroscopic material is a polyester or polyether, such as poly(ethylene glycol). The poly(ethylene glycol) may have an average molecule weight of about 100 g/mol to about 5,000 g/mol. In some preferred embodiments, the poly(ethylene glycol) has an average molecule weight of about 100 g/mol to about 2,000 g/mol. The poly(ethylene glycol) may have an average molecular weight of about 200, 300, 400, 500, 750, 1,000, 1,250, 1,500, 1,750, 2,000, 3,000, 4,000, or 5,000 g/mol, for example.

The low-surface-energy polymer and the hygroscopic material may be present in a segmented copolymer. For example, the segmented copolymer may comprise:

(a) one or more first soft segments selected from fluoropolymers having an average molecular weight from about 500 g/mol to about 10,000 g/mol, wherein the fluoropolymers are ($\alpha,\omega$)-hydroxyl-terminated and/or ($\alpha,\omega$)-amine-terminated;

(b) one or more second soft segments selected from polyesters or polyethers having an average molecular weight from about 100 g/mol to about 5,000 g/mol, wherein the polyesters or polyethers are ($\alpha,\omega$)-hydroxyl-terminated and/or ($\alpha,\omega$)-amine-terminated;

(c) in one or more hard segments, a reacted form of one or more isocyanate species possessing an isocyanate functionality of 2 or greater; and (d) in the one or more hard segments, a reacted form of one or more polyol or polyamine chain extenders or crosslinkers.

In the segmented copolymer, the average length scale of phase inhomogeneity is a length scale between the first soft segments and the second soft segments. Separately, the microstructure may be further characterized in that the hard segments are separated from the first soft segments and/or the second soft segments on an average nanophase-separation length scale from about 5 nanometers to about 100 nanometers.

Phase inhomogeneity typically causes opaque coatings or films due to the scattering of light. Scattering of light including visible wavelengths in the bulk of a material is governed by changes in the index of refraction through the medium. Variations in refractive index at length scales near the wavelength of the propagating radiation will tend to scatter those wavelengths more effectively (Mie scattering), resulting in an opaque or white appearance for a coating. With visible light having a wavelength range of about 400-800 nm, a clear or transparent coating preferably keeps variations in index of refraction below about 50 nm in length. As phase inhomogeneities increase in length scale, the opacity of the material rises. Phase inhomogeneities with average length scales of at least 0.1 µm are expected to drive significant scattering in the material, leading to less-transparent structures above 25 µm in thickness—unless the multiple phases are refractive index-matched. See Althues et al., "Functional inorganic nanofillers for transparent polymers", *Chem. Soc. Rev.* 2007, 36, 1454-1465, which is hereby incorporated by reference.

Some variations utilize a two-step synthesis for making segmented block copolymers having soft segments and a hard segment. A typical segmented copolymer synthesis starts with making the soft segment by reacting a flexible difunctional polymer (typically with molecular weight from 500 g/mol to 5,000 g/mol with functional groups in the form —XH, where X=O and/or NH) with an excess of diisocyanate (OCN—R—NCO) species. The XH:NCO ratio is typically from 1:2 to 1:10. The diisocyanate species is used in excess to allow an increase in molecular weight for forming a viscous prepolymer mixture, while preventing premature chain extension to large-molecular-weight polymers that lose mobility and workability. A second step involves chain extension by reacting the prepolymer with a low-molecular-weight difunctional curative (also known as a chain extender) having hydroxyl (—OH) and/or amine (—NH$_2$) functional groups. This chain extender is added to stoichiometrically balance the functional groups —XH relative to the isocyanate reactive groups —NCO (the XH:NCO ratio is typically about 1:1), producing high-molecular-weight polymer chains. This second step produces a high density of urethane or urea groups having a high level of hydrogen bonding, making up the rigid hard segment.

In contrast to traditional segmented block copolymers, the preferred synthesis herein incorporates two separate soft segments. In some embodiments, the soft segments contain poly(ethylene glycol) (PEG) in first soft segments, and perfluoropolyether (PFPE) in second soft segments. These two soft segments are chosen due to the unique properties they can impart on the coating, such as the PEG acting as a freezing-point depressant for ice, and the PFPE providing a non-stick (low-surface-energy) surface.

In some embodiments, the first soft segment, e.g. PEG, is reacted with the excess diisocyanate until most or all the PEG functional groups are used up. The second soft segment is then added to the reaction mixture and allowed to link up to grown oligomer chains, making a prepolymer that can then be reacted with a low-molecular-weight chain extender. Due to the immiscibility between PEG and PFPE, they tend to phase-separate. However, in the reaction pot the PEG and PFPE components are mixing at a high rate and covalently linking together through reactions with diisocyanates. An emulsion is created. This prepolymer emulsion is then combined with a chain extender and cured to form a durable film. During curing, the emulsion droplets coalesce and form a microstructure with discrete domains of PFPE-rich regions in a continuous PEG domain. This heterogeneous structure helps to drive reduced ice adhesion. When the length scales are sufficiently small, as described herein, the coating is transparent.

In particular, the emulsion prepolymer is processed and mixed with high energy and/or high pressure to reduce the emulsion droplets to within the average range of 0.01 µm to 10 µm, such as about 0.1 µm (100 nanometers) or less, prior to curing a coating. By reducing the length scale of the discrete domains, the scattered light within the cured coating is reduced, leading to more transparent coatings.

High-energy mixing may be accomplished by exposing the prepolymer mixture to sonication (acoustic energy) by using an ultrasonic bath sonicator, a probe sonicator, sonicator horns, or another effective sonication device. High-pressure mixing may be accomplished by passing the prepolymer mixture through a rotor-stator, a colloid mill, a homogenizer, or a microfluidizer, for example, to reduce the droplet size of the emulsion. Generally speaking, high-energy and/or high-pressure processing and mixing may be provided by mechanical shear, sonication, or both of these.

When mechanical shear is applied, the shear rates imparted to the prepolymer may be from about $10^5$ s$^{-1}$ to about $10^8$ s$^{-1}$, such as from about $10^6$ s$^{-1}$ to about $10^7$ s$^{-1}$. In various embodiments, such as those employing high-pressure microfluidization, the shear rates are at least about $10^7$ s$^{-1}$. High shear rates may result from high pressure and/or from high energy applied to the prepolymer.

Conventional mixing is regarded as a mixing speed of 2,500 revolutions per minute (rpm) or less, such as via a centrifugal mixer or overhead mixer. High-speed mixing is regarded as a mixing speed of greater than 2,500 rpm. High-speed mixing may be accomplished with a centrifugal mixer, a colloid mill, or a homogenizer, for example. For purposes of this specification, mixing at 2,500 rpm or less is deemed to not impart significant mechanical shear on the material being mixed, notwithstanding that a shear rate can always be calculated unless the material is static. Conversely, mixing at a mix speed greater than 2,500 rpm (i.e., high-speed mixing) is regarded as imparting significant mechanical shear on the material (i.e., prepolymer) being mixed.

When sonication is applied, the sonication frequencies imparted to the prepolymer may be from about 1 kHz to about 100 kHz, such as about 20 kHz or more (sometimes referred to as "ultrasonication" when sonication frequency is greater than 20 kHz). In various embodiments, the sonication frequencies are at least about 10 kHz. Sonication may or may not result in high local shear rates on prepolymer particles.

The tendency for PFPE and PEG to phase-separate is very high, and the small emulsion droplets will often coalesce if given enough time. In some embodiments, in addition to the mechanical shear or sonication during synthesis, the composition of the soft-segment precursors is adjusted. Refer to the Examples herein. In Example 1, high molecular weights of both PFPE and PEG are utilized. In Example 2, a low-molecular-weight PFPE ($M_n$<2,500 g/mol) is combined with a high-molecular-weight PEG ($M_n$>3,000 g/mol). In Example 5, a low-molecular-weight PFPE ($M_n$<2500 g/mol) is combined with a low-molecular-weight PEG ($M_n$<2,000 g/mol). In Example 6, a high-molecular-weight PFPE ($M_n$>3,000 g/mol) is combined with a low-molecular-weight PEG ($M_n$<2,000 g/mol). These precursors are combined while maintaining the same weight percent of PFPE and PEG in the final film (25 wt % to 50 wt % for each soft-segment component). The lower-molecular-weight PFPEs also have chain ends that are similar in structure to PEG, increasing the compatibility and reducing the length scale of microphase separation. After tuning the molecular weights of one or both starting soft segment precursors, different processing methods may be applied to modify the transparency of the final film.

The compositions may also be characterized by hierarchical phase separation. For example, the first solid material and the second solid material, in addition to being phase-separated on length scales from 10 nanometers to 10 microns, are typically nanophase-separated. As intended herein, two materials being "nanophase-separated" means that the two materials are separated from each other on a length scale from about 1 nanometer to less than 100 nanometers. For example, the nanophase-separation length scale may be from about 10 nanometers to about 90 nanometers.

The nanophase-separation length scale is hierarchically distinct from the microphase-separation length scale. With traditional phase separation in block copolymers, the blocks chemically segregate at the molecular level, resulting in regions of segregation on the length scale of the molecules, such as a nanophase-separation length scale from about 10 nanometers to about 100 nanometers. See Petrovic et al., "Polyurethane Elastomers", *Prog Polym Sci* Vol. 16, 695-836, 1991 and Lohse et al., "Microphase separation in block copolymers", *Current Opinion in Colloid & Interface Science* Vol. 2, Issue 2, 171-176, 1997, which are each hereby incorporated by reference herein, for their teachings regarding nanophase separation in copolymers. Note that nanophase separation is synonymous with "molecular-level segregation."

Hierarchical phase separation results from the process to make the composition. The extreme difference of the two soft segments means that in the reaction pot the soft segments do not mix homogeneously and so create discrete region that are rich in fluoropolymer or rich in non-fluoropolymer, e.g., poly(ethylene glycol) components, distinct from the molecular-level segregation. These emulsion droplets contain a large amount of polymer chains and are thus in the micron length-scale range. These length scales survive the curing process, so that the final material contains the microphase separation that was set-up from the emulsion, in addition to the molecular-level segregation. Chen et al., "Structure and morphology of segmented polyurethanes: 2. Influence of reactant incompatibility," *POLYMER* 1983, Vol. 24, pages 1333-1340, is hereby incorporated by reference herein for its teachings about microphase separation that can arise from an emulsion-based procedure.

The mechanism that creates the microphase separation is understood to be related to an oil-in-water style phase separation of immiscible components during synthesis and film casting. The multiple components can flow and separate, analogous to an oil-water emulsion, and the microphase separation is locked into place upon curing. The nanophase separation, at a smaller length scale than the microphase separation, arises from organization of the block copolymer at the molecular level.

The microphase separation is not directly related to the individual blocks segregating at the molecular level, but rather is driven by an emulsification process occurring between dissimilar materials in the reaction pot or in the mixing apparatus. For example, in some embodiments, PFPE and PEG flow and separate under high shear and/or sonication to create PFPE-rich and PEG-rich rich droplets or regions. High-energy or high-pressure forces reduce droplets to the 0.01-10 micron length scale range. When these precursors are combined with a curative and sprayed down on a surface using a carrier solvent, the PFPE-rich and PEG-rich droplets begin to coalesce as the solvent evaporates and the curative increases molecular weight of the system, causing it to gel. The final result is a discrete phase and a continuous phase at the 0.01-10 micron length scale.

In some embodiments, the nanophase separation is on the length scale of domains that include (1) a fluid-resistant, chemically inert, hydrophobic first soft segment; (2) a hygroscopic (water-absorbing) and/or liquid-swellable second soft segment; and (3) a rigid, highly associated hard segment that provides network reinforcement and stability. In a composition possessing hierarchical phase separation, a first microphase may contain nanophases of (1) along with nanophases of (3), while a second microphase may contain nanophases of (2) along with nanophases of (3).

Nanophase separation is only detectible with a suitable imaging technique. An imaging technique that cannot resolve features below 100 nanometers will not generally detect nanophase separation. Exemplary imaging techniques to measure nanophase separation include, but are not limited to, atomic force microscopy, high-resolution scanning electron microscopy, scanning tunneling microscopy, and nanoscale spectroscopy.

In embodiments in which the composite material is a polymer, the first-material phase and the second-material phase may be connected by polymer chain extension and/or polymer crosslinking. In some embodiments, the first-material phase and the second-material phase are covalently connected in a block copolymer, such as a segmented urethane/urea block copolymer.

As intended herein, a "block copolymer" means a copolymer containing a linear arrangement of blocks, where each block is defined as a portion of a polymer molecule in which the monomeric units have at least one constitutional or configurational feature absent from the adjacent portions. Several types of block copolymers are generally possible, including AB block copolymers, ABA block copolymers, ABC block copolymers, segmented block copolymers, and random copolymers. Segmented block copolymers are preferred, in some embodiments of the invention.

In some low-ice-adhesion coatings, one of the first-material phase and the second-material phase is hydrophobic, and the other is hydrophilic. In these or other embodiments, one of the first-material phase and the second-material phase is hydrophobic, and the other is hygroscopic. In these or other embodiments, one of the first-material phase and the second-material phase is hygroscopic, and the other comprises a low-surface-energy polymer having a surface energy between about 5 mJ/m$^2$ to about 50 mJ/m$^2$.

As intended in this patent application, "hygroscopic" means that the material is capable of attracting and holding water molecules from the surrounding environment. The water uptake of various polymers is described in Thijs et al., "Water uptake of hydrophilic polymers determined by a thermal gravimetric analyzer with a controlled humidity chamber", *J. Mater. Chem.* (17) 2007, 4864-4871, which is hereby incorporated by reference herein. In some embodiments, the hygroscopic material is characterized by a water absorption capacity, at 90% relative humidity and 30° C., of at least 5, 10, 15, 20, 25, 30, 35, 40, 45, or 50 wt % increase due to water uptake.

In some embodiments, the low-surface-energy polymer is a fluoropolymer, such as a fluoropolymer selected from the group consisting of polyfluoroethers, perfluoropolyethers, polyfluoroacrylates, polyfluorosiloxanes, polytetrafluoroethylene (PTFE), polyvinylidene difluoride (PVDF), polyvinylfluoride (PVF), polychlorotrifluoroethylene (PCTFE), copolymers of ethylene and trifluoroethylene, copolymers of ethylene and chlorotrifluoroethylene, and combinations thereof. In certain embodiments, the fluoropolymer is not a polyfluorosiloxane.

In some embodiments, the hygroscopic material is selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacryalate, monoacrylate, and combinations thereof.

The low-surface-energy polymer and the hygroscopic material may be covalently connected in a block copolymer. In these embodiments, the block copolymer may be a segmented copolymer composition comprising:
(a) one or more first soft segments selected from fluoropolymers having an average molecular weight from about 500 g/mol to about 10,000 g/mol, wherein the fluoropolymers are (α,ω)-hydroxyl-terminated and/or (α,ω)-amine-terminated;

(b) one or more second soft segments selected from polyesters or polyethers, wherein the polyesters or polyethers are (α,ω)-hydroxyl-terminated and/or (α,ω)-amine-terminated;

(c) one or more isocyanate species, or a reacted form thereof, possessing an isocyanate functionality of 2 or greater; and (d) one or more polyol or polyamine chain extenders or crosslinkers, or a reacted form thereof.

A total content of the one or more first soft segments and the one or more second soft segments may be from about 40% by weight to about 90% by weight, based on a total weight percent of the composition. The composition further comprises one or more hard segments present in an amount of from about 15% by weight to about 50% by weight, based on the total weight percent of the composition. The one or more hard segments comprise a combination of one or more isocyanate species and one or more low-molecular-weight polyol or polyamine chain extenders or crosslinkers. Optionally, the molar ratio of the second soft segments to the first soft segments is less than 4.0, such as less than 2.0.

In specific embodiments, the fluoropolymers include a fluoropolymer having the structure:

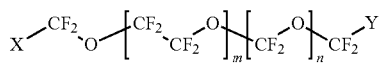

wherein:
X, Y=CH$_2$—(O—CH$_2$—CH$_2$)$_p$—OH wherein p=0 to 50 and wherein X and Y are independently selected;
m=1 to 100; and
n=0 to 100, or 1 to 100.

Note that the X group, the Y group, or both of these may alternatively be amine-terminated and/or thiol-terminated rather than hydroxyl-terminated.

In some embodiments, the polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

In some embodiments, the isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

At least one of the one or more polyol or polyamine chain extenders or crosslinkers may possess a functionality of 2, 3, or greater.

In some embodiments, at least one of the one or more polyol or polyamine chain extenders or crosslinkers is selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-buatendiamine, diethyltoluenediamine, dimethylthiotoluenediamine, isophoronediamine, diaminocyclohexane, N,N,N',N'-tetrakis(2-hydroxypropyl)ethylenediamine, and homologues, derivatives, or combinations thereof.

The hard segment may be present in an amount from about 5 wt % to about 60 wt %, based on total weight of the composition.

It is noted that (α,ω)-terminated polymers are terminated at each end of the polymer. The α-termination may be the same or different than the w-termination. Also it is noted that in this disclosure, "(α,ω)-termination" includes branching at the ends, so that the number of terminations may be greater than 2 per polymer molecule. The polymers herein may be linear or branched, and there may be various terminations and functional groups within the polymer chain, besides the end (α,ω) terminations.

In some embodiments, the molar ratio of the second soft segments to the first soft segments is from about 0.1 to about 1.5. In various embodiments, the molar ratio of the second soft segments to the first soft segments is about, at least about, or at most about 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 1.95.

In this description, "polyurethane" is a polymer comprising a chain of organic units joined by carbamate (urethane) links, where "urethane" refers to N(H)—(C=O)—O—. Polyurethanes are generally produced by reacting an isocyanate containing two or more isocyanate groups per molecule with one or more polyols containing on average two or more hydroxyl groups per molecule, in the presence of a catalyst.

Polyols are polymers in their own right and have on average two or more hydroxyl groups per molecule. For example, α,ω-hydroxyl-terminated perfluoropolyether is a type of polyol.

"Isocyanate" is the functional group with the formula —N=C=O. For the purposes of this disclosure, O—C(=O)—N(H)—R is considered a derivative of isocyanate.

"Polyfluoroether" refers to a class of polymers that contain an ether group—an oxygen atom connected to two alkyl or aryl groups, where at least one hydrogen atom is replaced by a fluorine atom in an alkyl or aryl group.

"Perfluoropolyether" (PFPE) is a highly fluorinated subset of polyfluoroethers, wherein all hydrogen atoms are replaced by fluorine atoms in the alkyl or aryl groups.

"Polyurea" is a polymer comprising a chain of organic units joined by urea links, where "urea" refers to N(H)—(C=O)—N(H)—. Polyureas are generally produced by reacting an isocyanate containing two or more isocyanate groups per molecule with one or more multifunctional amines (e.g., diamines) containing on average two or more amine groups per molecule, optionally in the presence of a catalyst.

A "chain extender or crosslinker" is a compound (or mixture of compounds) that link long molecules together and thereby complete a polymer reaction. Chain extenders or crosslinkers are also known as curing agents, curatives, or hardeners. In polyurethane/urea systems, a curative is typically comprised of hydroxyl-terminated or amine-terminated compounds which react with isocyanate groups present in the mixture. Diols as curatives form urethane linkages, while diamines as curatives form urea linkages. The choice of chain extender or crosslinker may be determined by end groups present on a given prepolymer. In the case of isocyanate end groups, curing can be accomplished through chain extension using multifunctional amines or alcohols, for example. Chain extenders or crosslinkers can have an average functionality greater than 2 (such as 2.5, 3.0, or greater), i.e. beyond diols or diamines.

The one or more chain extenders or crosslinkers (or reaction products thereof) may be present in a concentration, in the segmented copolymer composition, from about 0.01 wt % to about 25 wt %, such as about 0.05 wt % to about 10 wt %.

Following a suitable chemical reaction, the segmented copolymer composition contains, in a hard segment, the reacted form of the one or more isocyanate species, combined with the reacted form of the one or more polyol or polyamine chain extenders or crosslinkers. In some embodiments, the hard segment is present in an amount from about 5 wt % to about 60 wt %, based on total weight of the composition.

The glass-liquid transition, or glass transition, is the reversible transition in amorphous materials (or in amorphous regions within semicrystalline materials) from a hard and relatively brittle "glassy" state into a viscous or rubbery state as the temperature is increased. The glass-transition temperature $T_g$ of a material characterizes the range of temperatures over which this glass transition occurs. $T_g$ is always lower than the melting temperature, $T_m$, of the crystalline state of the material, if a melting temperature exists.

Despite the change in the physical properties of a material through its glass transition, the transition is not considered a phase transition; rather it is a phenomenon extending over a range of temperature and defined by one of several conventions. Upon cooling or heating through this glass-transition range, the material also exhibits a smooth step in the thermal-expansion coefficient and in the specific heat, with the location of these effects again being dependent on the history of the material. Glass is believed to exist in a kinetically locked state, and its entropy, density, and so on, depend on the thermal history. Therefore, the glass transition is primarily a dynamic phenomenon.

Different operational definitions of $T_g$ are in use. One definition refers to the viscosity, fixing $T_g$ when the material viscosity is $10^{12}$ Pa·s. In contrast to viscosity, the thermal expansion, heat capacity, shear modulus, and many other properties of inorganic glasses show a relatively sudden change at the glass-transition temperature. Any such step or kink can be used to define $T_g$. For example, one definition of $T_g$ uses the energy release on heating in differential scanning calorimetry. Typically, the sample is first cooled at $-10°$ C./min and then heated at $10°$ C./min. Another definition of $T_g$ uses the kink in thermal expansion. Here, heating rates of 3-5° C./min are common.

In polymers at or above their glass-transition temperature, molecular chains slide past each other when a force is applied. The introduction of relatively stiff chemical groups (such as benzene rings) will interfere with the flowing process and hence increase $T_g$. The stiffness of thermoplastics decreases due to this effect. Thus, a common definition of $T_g$ uses a kink in stiffness, measured by storage modulus. For example, the midpoint of a curve of storage modulus versus temperature, upon cooling, may be taken as an estimate of $T_g$ (see, e.g., FIG. 9).

While PFPE materials have glass-transition temperatures typically less than $-80°$ C. (U.S. Pat. No. 5,026,814 issued Jun. 25, 1991 to Re et al., which is incorporated by reference herein), composite materials combining PFPE and PEG, or many other soft segments, will display a $T_g$ considerably higher that $-80°$ C. and much higher than either of the individual soft-segment components, PFPE ($T_g=-90°$ C. to $-100°$ C.) and PEG ($T_g=-66°$ C.). This is due to the higher-$T_g$ PEG component as well as the modifying effect of the urethane/urea bonds (hard segments) between segments that produce a stiffening effect. In general, the composite material of the present invention may have a $T_g$ value that is intermediate between the $T_g$ of the two soft-segment components, or is higher than the $T_g$ of either of the two soft-segment components. The reason is that the hard segments themselves typically have high $T_g$ values, such as at least 0° C., at least 50° C., or at least 100° C.

In some embodiments, the first soft segments have an average glass-transition temperature from about $-150°$ C. to about 0° C., such as from about $-100°$ C. to about $-50°$ C. In these or other embodiments, the second soft segments have an average glass-transition temperature from about $-100°$ C. to about 50° C., such as from about $-75°$ C. to about 0° C. In any of these embodiments, the hard segments may have an average glass-transition temperature from about $-25°$ C. to about 250° C., such as from about 50° C. to about 150° C.

In some embodiments, the composite material has a glass-transition temperature above (a higher temperature than) $-60°$ C. or above $-30°$ C. The glass-transition temperature of the composite material may be about, or at least about, $-75°$ C., $-70°$ C., $-65°$ C., $-60°$ C., $-55°$ C., $-50°$ C., $-40°$ C., $-30°$ C., $-20°$ C., $-10°$ C., 0° C., 10° C., 20° C., 30° C., 40° C., or 50° C. In various embodiments, the glass-transition temperature of the composite material is less than about 20° C., less than about 0° C., or less than about $-20°$ C.

The transparent icephobic coating optionally further includes one or more additional components selected from the group consisting of a particulate filler, a pigment, a dye, a plasticizer, a flame retardant, a flattening agent, a surfactant, and a substrate adhesion promoter. A particulate filler (when present) may be selected from the group consisting of silica, alumina, silicates, talc, aluminosilicates, barium sulfate, mica, diatomite, calcium carbonate, calcium sulfate, carbon, wollastonite, and combinations thereof. The particulate filler may be surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof. The particulate fillers are preferably in the size range of about 5 nm to about 2 μm, such as about 20 nm to 100 nm.

The icephobic coating is typically disposed on a substrate surface. In some variations, the icephobic coating is formed into a bulk object, with no substrate. At least one surface of such an object can be characterized as a coating (e.g., a self-healing coating).

In some embodiments, the transparent icephobic coating is characterized by an AMIL Centrifuge Ice Adhesion Reduction Factor of about 50 or more when subjected to an AMIL Centrifuge Ice Adhesion Test. In various embodiments, the transparent icephobic coating is characterized by an AMIL Centrifuge Ice Adhesion Reduction Factor of about 55, 60, 65, 70, 75, 80, 85, 90, 95, 100, or more.

AMIL is the Anti-icing Materials International Laboratory located at the Université du Québec à Chicoutimi in Chicoutimi, Quebec, Canada. The icephobic character of a coating can be evaluated by measuring the ice adhesion reduction effect of a candidate coating compared to an uncoated surface. AMIL can evaluate icephobic coatings in many different atmospheric conditions (wind and temperature) with glaze or rime accreted ice obtained with a simulation of freezing precipitation.

A single "Centrifuge Adhesion Test" by AMIL consists of the ice adhesion measurement of three small aluminum beams covered with the candidate product, compared with three bare beams. The extremity of the six sample beams are iced simultaneously with freezing precipitation on about 5 cm² surface to a thickness of about 7 mm. Each sample beam is rotated and balanced in the centrifuge apparatus. The rotation speed increases with a constant acceleration rate until the centrifugal force resulting from rotation reaches the adhesion stress of ice, detaching the ice. This detachment is picked up by a piezoelectric cell (sensitive to vibrations) which relays signals in real time to a computer. Finally, the adhesion stress is calculated using detachment speed, the mass of ice, and the beam length.

The Adhesion Reduction Factor, ARF (herein also referred to as "AMIL ARF") is calculated using the average stress measured on the three coated beams compared to the average stress measured on the three bare (control) beams. In particular, from the centrifugal force the stress is determined as $F=mr\omega^2$ where F=centrifugal force [N], m=mass of ice [kg], r=radius of the beam [m], and ω=speed of rotation [rad/s]. The Adhesion Reduction Factor (AMIL ARF) is then calculated using the average stress measured on the three coated beams compared to the average stress measured on the three bare beams: $ARF=\tau_{base}/\tau_{coated}$ where $\tau_{base}$=average stress measured on three simultaneously iced bare beams [Pa] and $\tau_{coated}$=average stress measured on three simultaneously iced beams with candidate icephobic coating [Pa]. The web site www.uqac.ca/amil/en/icephobic-coatings/centrifuge, as retrieved on May 30, 2017, is hereby incorporated by reference herein.

An ARF value of 1 means there is no icephobic effect. An ARF value greater than 1 means there is an ice-adhesion reduction (icephobic effect); the higher the value, the more icephobic the coating. Note that the AMIL Centrifuge Ice Adhesion Reduction Factor is intrinsically tied to the physical microstructure at the surface as well as the chemical composition. The AMIL Centrifuge Ice Adhesion Reduction Factor is not a parameter that depends on intended use of the material, and it is not a functional limitation. Rather, the AMIL Centrifuge Ice Adhesion Reduction Factor is a defined, structural property of the material.

In some variations of the invention, a material or coating precursor is applied to a substrate (such as a surface of an automobile or aircraft) and allowed to react, cure, or harden to form a final low-ice-adhesion coating, wherein the material, coating precursor, or final coating contains a segmented copolymer composition.

In some embodiments, the hygroscopic material is also hardenable, either alone or in combination with the low-surface-energy polymer. For instance, a low-surface-energy polymer and a hygroscopic polymer may form a high-molecular-weight block copolymerize and thus harden. In certain embodiments, the hygroscopic material assists in the curability (hardenability) of the low-surface-energy polymer.

In some embodiments, a precursor material is prepared and then dispensed (deposited) over an area of interest. Any known methods to deposit precursor materials may be employed. A fluid precursor material allows for convenient dispensing using spray coating or casting techniques over a large area, such as the scale of a vehicle or aircraft.

The fluid precursor material may be applied to a surface using any coating technique, such as (but not limited to) spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. The fluid precursor material may be rapidly sprayed or cast in thin layers over large areas (such as multiple square meters).

When a solvent or carrier fluid is present in the fluid precursor material, the solvent or carrier fluid may include one or more compounds selected from the group consisting of water, alcohols (such as methanol, ethanol, isopropanol, or tert-butanol), ketones (such as acetone, methyl ethyl ketone, or methyl isobutyl ketone), ethers (such as diethyl ether, tetrahydrofuran, or dioxane), hydrocarbons (e.g., toluene), acetates (such as tert-butyl acetate or n-butyl acetate), acids (such as organic acids), bases, and any mixtures thereof. When a solvent or carrier fluid is present, it may be in a concentration of from about 5 wt % to about 99 wt % or higher, for example.

The precursor material may be converted to an intermediate material or the final material using any one or more of curing or other chemical reactions, or separations such as removal of solvent or carrier fluid, monomer, water, or vapor. Curing refers to toughening or hardening of a polymeric material by cross-linking of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening process, if desired, to adjust pH, stability, density, viscosity, color, or other properties, for functional, ornamental, safety, or other reasons.

The overall thickness of the final material or coating may be from about 1 μm to about 1 cm or more, such as about 5 μm, 10 μm, 20 μm, 25 μm, 30 μm, 40 μm, 50 μm, 75 μm, 100 μm, 200 μm, 300 μm, 400 μm, 500 μm, 750 μm, 1 mm, 2 mm, 3 mm, 4 mm, 5 mm, 6 mm, 7 mm, 8 mm, 9 mm, 10 mm, or more.

Relatively thick coatings offer good durability and mechanical properties, such as impact resistance, while being relatively lightweight. In certain embodiments, a transparent icephobic film has a thickness from about 10 microns to about 10 millimeters. If desired, a coating may have a varying thickness, such as greater thickness at high surface curvature, for example.

The transparent icephobic coating may be characterized by a contact angle of water on a coating surface of greater than 90°. Such a coating may be characterized by an average kinetic delay of surface ice formation of at least 5 minutes at −10° C.

The transparent icephobic coating may be characterized by a water absorption capacity of at least 10 wt % water based on total weight of the low-friction, low-adhesion material. The material is characterized, according to some embodiments, by a water absorption capacity of at least 1, 2, 3, 4, 5, 6, 7, 8, or 9 wt % water, preferably at least 10, 11, 12, 13, 14, 15, 16, 17, 18, 19, or 20 wt % water, based on total weight of the material.

The transparent icephobic coating may be characterized by a surface contact angle of water of greater than 90° (hydrophobic). The material may also be hydrophilic, i.e. characterized by an effective contact angle of water that is less than 90°. In various embodiments, the material is characterized by an effective contact angle of water of about 70°, 75°, 80°, 85°, 90°, 95°, 100°, or higher.

In some embodiments, the transparent icephobic coating is characterized by a coefficient of friction, measured at 40-55% (e.g. 50%) relative humidity and room temperature, less than 1, 0.9, 0.8, 0.7, 0.6, 0.5, 0.4, or 0.3. In these or other embodiments, the material is characterized by a coefficient of friction, measured at 85-90% relative humidity and room temperature, less than 0.8, 0.7, 0.6, 0.5, 0.4, 0.3, or 0.2. The low-ice-adhesion material may be characterized by a coefficient of friction, measured at about 90% relative humidity, less than 0.5.

The coefficient of friction is relatively low due to the presence of a lubricating surface layer. By a "lubricating surface layer in the presence of humidity," it is meant a layer, multiple layers, a partial layer, or an amount of substance that lubricates the substrate such that it has a lower coefficient of friction compared to the substrate without the low-ice-adhesion material present, when in the presence of some amount of atmospheric humidity. Relative humidity is the ratio of the water vapor density (mass per unit volume) to the saturation water vapor density. Relative humidity is also approximately the ratio of the actual to the saturation vapor pressure.

The substance that lubricates the substrate is primarily water, but it should be noted that other components from the environment may be present in the lubricating surface layer, including oils, metals, dust, dissolved gases, dissolved aqueous components, suspended non-aqueous components, fragments of debris, fragments of polymers, and so on.

The transparent icephobic coating may be characterized by a delay in the formation of ice on a surface of the material. For example, when a coating surface is held at −10° C., the transparent icephobic coating provided by the invention may be characterized by an average delay in the formation of ice on the surface of at least about 5, 10, 15, 20, 25, 30 minutes, or more.

In various embodiments, the material is a coating and/or is present at a surface of an object or region. The material may be utilized in relatively small applications, such as lens coatings, or for large structures, such as aircraft wings. In principle, the material could be present within a bulk region of an object or part. In certain embodiments, the coating provided herein is disposed with a temporary, protective laminating film for storage or transport, which film is later removed.

EXAMPLES

Materials: Poly(ethylene glycol) (PEG) $M_n$=3,350 g/mol, poly(ethylene glycol) $M_n$=1,000 g/mol, 4,4'-methylenebis (cyclohexyl isocyanate) (HMDI), 1,4-butanediol (BD), dibutyltin dilaurate (DBTDL), tetrahydrofuran, toluene, 2-butanone, 1,3-bis(trifluoromethyl)benzene, n-butyl acetate, and methyl isobutyl ketone are purchased from Aldrich. PFPE (Fluorolink 5147x and Fluorolink D4000) is purchased from Solvay Specialty Polymers. All chemicals are used as received without further purification. Activated sieves may be added to solvents to remove trace amounts of water, which can give side products during polyurethane synthesis.

Mechanical Shear Method: Microfluidization of prepolymers may be applied prior to curing. In order to homogenize the prepolymer using a microfluidizer, a solvent must be chosen that is compatible for both PFPE and PEG. The Example 1, Example 2, Example 3, and Example 4 prepolymers may be dispersed in the organic solvents benzene, toluene, xylenes, or mixtures thereof, for example. The Example 5 and Example 6 prepolymers may be dispersed in n-butyl acetate, for example. The prepolymers are dispersed in organic solvent with the final solid resin weight content ranging from 30% to 75% (25% to 70% volatiles). The prepolymer solution is passed through a M110L microfluidizer (Microfluidics, Newton, Massachusetts, US) prior to addition of the curative. Color and viscosity changes may occur.

Sonication Method: Tip sonication of prepolymers may be applied prior to curing. In order to apply high energy using tip sonication, a solvent must be chosen that is compatible for both PFPE and PEG. The Example 1, Example 2, Example 3, and Example 4 prepolymers may be dispersed in the organic solvents benzene, toluene, xylenes, or mixtures thereof, for example. The Example 5 and Example 6 prepolymers may be dispersed in n-butyl acetate, for example. The prepolymers are dispersed in organic solvent with the final solid resin weight content ranging from 75% to 99% (1% to 25% volatiles). A tip sonicator (Ultrasonic Processor UP400S, Hielscher Ultrasonics, Teltow, Germany) is submerged in the prepolymer and turned on to 50% power. Sonication is applied from 15 to 120 seconds with caution not to heat up the bulk solution. The curative is then added and quickly mixed in prior to drop casting and forming a film.

Confocal Laser Scanning Microscopy: The polymer network of the materials produced in these Examples is composed of both a water-absorbing (hydrophilic) material and a water-repelling (hydrophobic) material. To investigate the film's network and phase separation of the opposing materials, confocal laser scanning microscopy (CLSM) is employed. CLSM is an optical imaging technique that detects fluorescence by exposing the specimen to light of a certain wavelength to excite fluorescent dyes. Samples are prepared by soaking a thin slice of film in an aqueous solution containing fluorescein (10 to 100 µM), a water-soluble dye, for 24 hours. The thinner the film, the better for allowing light to go through the sample. Confocal microscopy allows imaging of xy-plane with thin optical z-slice to prevent background fluorescence. Water absorbed by the film contains fluorescein, allowing contrast between the hydrophilic and hydrophobic domains. Once removed from the solution, the film is rinsed with DI water to remove excess fluorescein from the surface. The film is quickly pat dried to remove water droplets and placed on a glass slide (75×25 mm). A glass coverslip (0.17 mm thick) is placed firmly on the film and the edges are sealed with a quick cure 5-minute epoxy. The edges are sealed to prevent evaporation of water to allow optimal imaging of the specimen by better matching the refractive index of the glass. The fluorescent imaging is obtained using a Leica SP 5 confocal microscope with an Ar laser for an excitation wavelength of 496 nm for fluorescein, giving an emission at 512 nm in water.

In the CLSM images, the fluorescent regions (which display as green regions in the color drawings and lighter regions when reproduced in grayscale) are representative of hydrophilic PEG regions containing a water-soluble fluorescent dye. The inclusions (which display as darker regions) are representative of hydrophobic fluoropolymer regions.

Example 1: Synthesis of Icephobic Coating

Hydroxy-terminated poly(ethylene glycol) ($M_n$=3,350 g/mol, 7.65 g, 2.25 mmol) is placed in a 3-neck roundbottom flask that contains an inlet for argon and is equipped with an overhead stirrer (Teflon shaft and blade). While stirring, 4,4'-methylenebis(cyclohexyl isocyanate) (5.90 g, 22.50 mmol) is added to the solution and the flask is placed in an oil bath at 100° C. Dibutyltin dilaurate (0.02 wt %) is then added to the solution using a micropipette and the reaction is allowed to proceed. After 1 hour, Fluorolink D4000

($M_n$=4,000 g/mol, 9.00 g, 2.25 mmol) is added to the stirring solution and allowed to react for 1 hour at 100° C. The prepolymer is allowed to cool slightly before addition of n-butyl acetate (1.3 g). After the addition of n-butyl acetate, the prepolymer is mixed at 300 rpm (or generally from about 200 to 2,500 rpm). Alternatively, or additionally, the prepolymer is optionally subjected to microfluidization or tip sonication (see methods above).

The chain extender (curative) 1,4-butanediol (1.62 g, 17.98 mmol) is then added to the prepolymer. The curative and prepolymer solution are combined in a plastic mixing container (FlackTek-speedmixer compatible) and placed in the FlackTek speedmixer at 2,300 rpm for 15 to 60 seconds. The polymer is drop-casted to form a film or diluted further to spray using an air gun, to create a polyurethane film/coating.

Figure 1B:
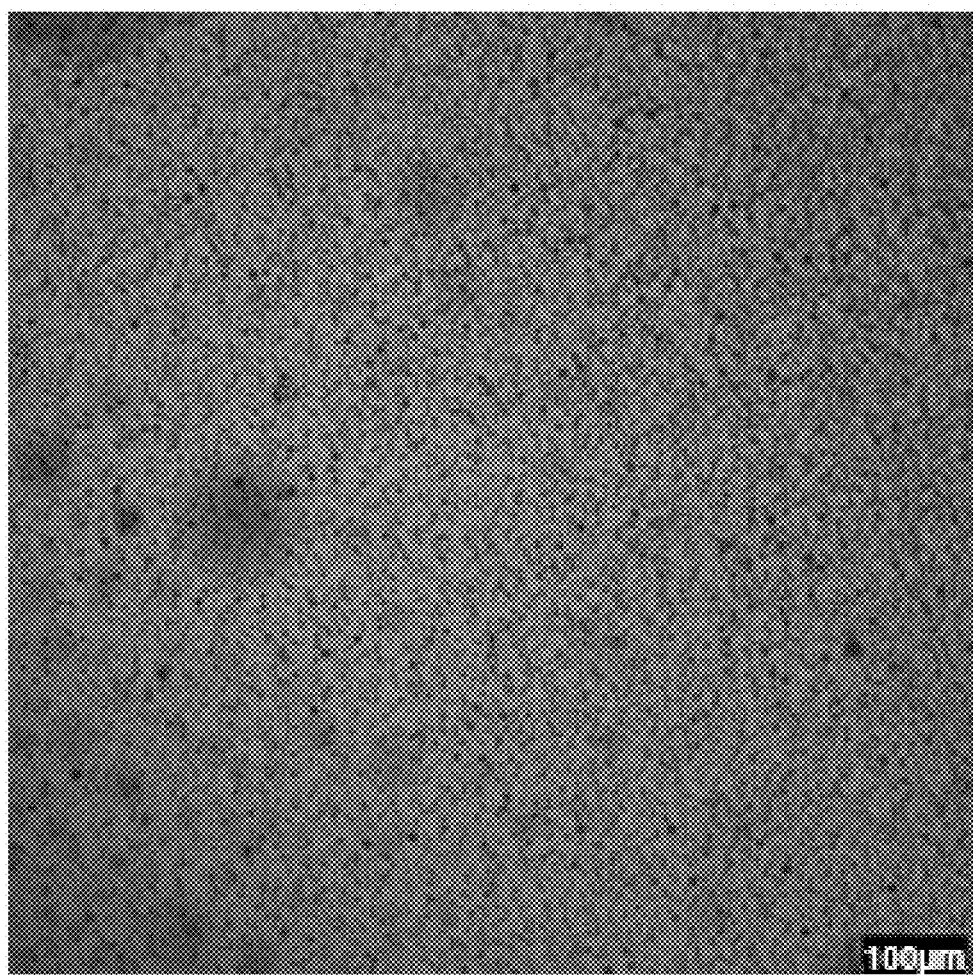
FIG. 1B is a CLSM image (scale bar 100 µm) for the Example 1 coating produced using tip sonication for 30 seconds during polymer synthesis.
Figure 1C:
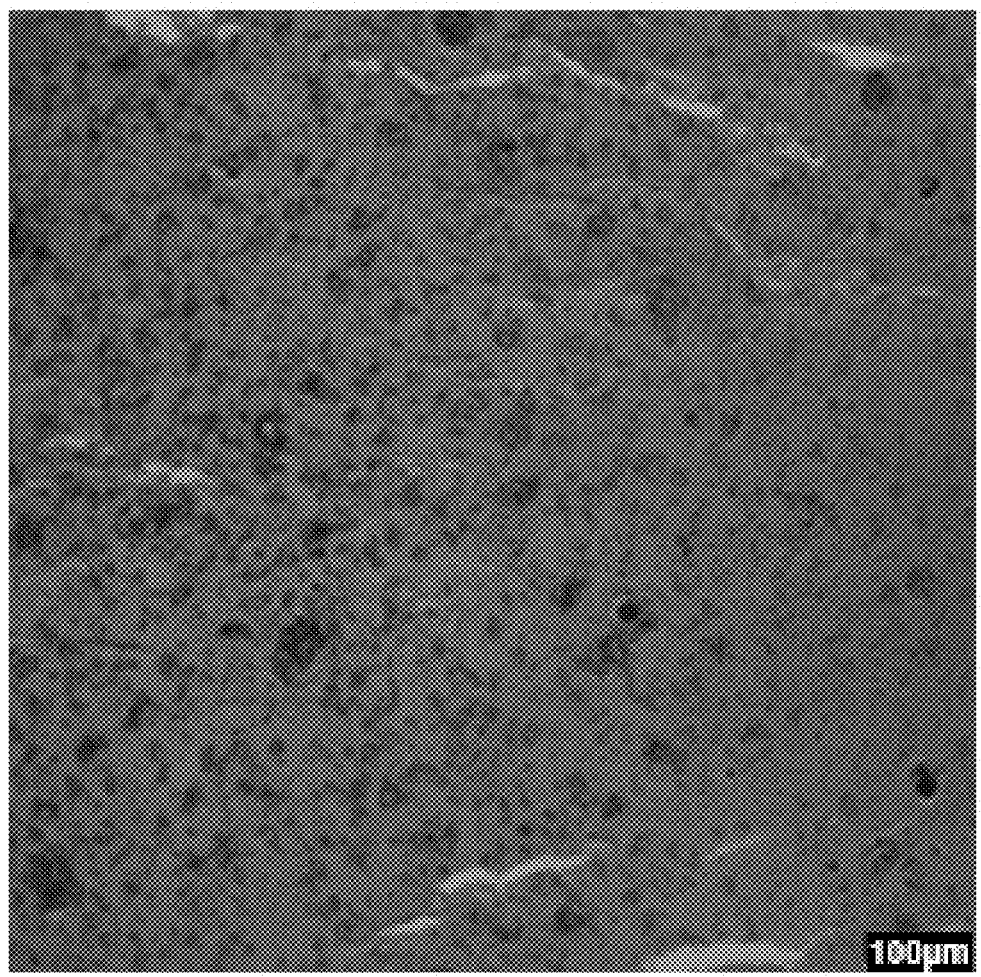
FIG. 1C is a CLSM image (scale bar 100 µm) for the Example 1 polymer produced using microfluidization during polymer synthesis.

FIG. 1A is a confocal laser scanning microscopy (CLSM) image (scale bar 100 µm) for the Example 1 coating produced using conventional, 200-2,500 rpm prepolymer mixing during polymer synthesis. FIG. 1B is a CLSM image (scale bar 100 µm) for the Example 1 coating produced using tip sonication for 30 seconds during polymer synthesis. FIG. 1C is a CLSM image (scale bar 100 µm) for the Example 1 polymer produced using microfluidization during polymer synthesis. In FIGS. 1A, 1B, and 1C, the fluorescent regions (which display as green regions in the color drawings and lighter regions when reproduced in grayscale) are representative of hydrophilic PEG regions. The inclusions (which display as darker regions) are representative of hydrophobic fluoropolymer regions. The discrete domains of PFPE are reduced in size after applying sonication or microfluidization. In particular, FIG. 1A shows PFPE domains that are about 10-50 µm in size, while FIG. 1B and FIG. 1C show PFPE domains that are less than 10 µm in size.

Figure 2A:
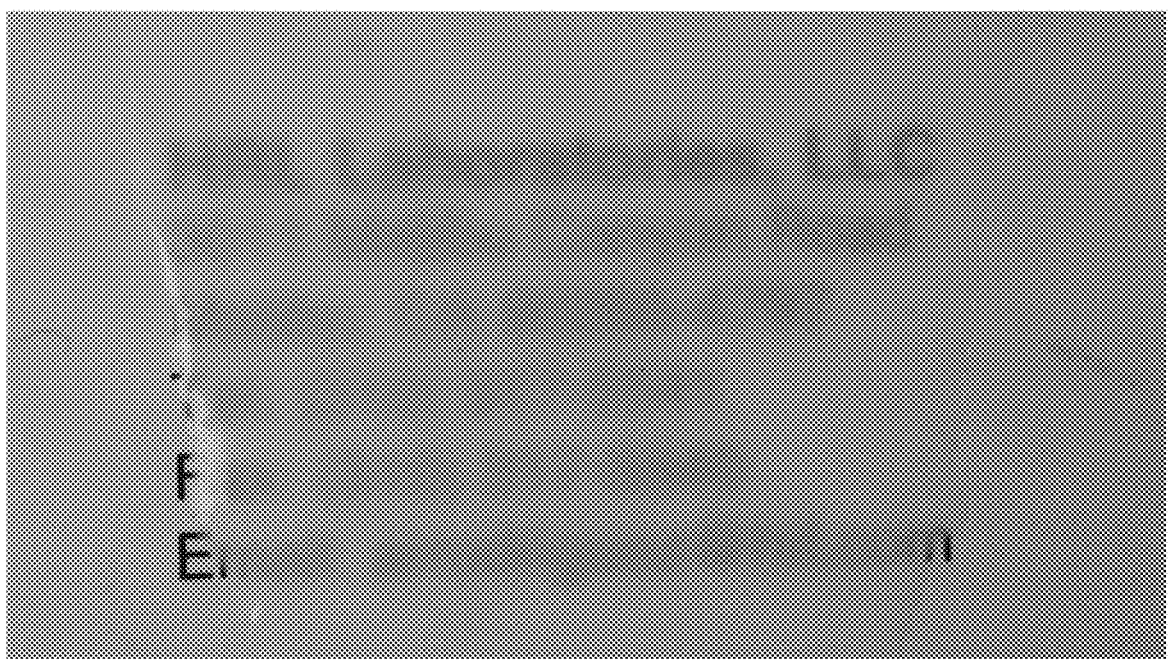
FIG. 2A is an optical micrograph of the Example 1 coating produced using conventional prepolymer mixing during polymer synthesis.
Figure 2B:
FIG. 2B is an optical micrograph of the Example 1 coating produced using tip sonication for 30 seconds during polymer synthesis.

FIG. 2A is an optical micrograph (no magnification) of the Example 1 coating disposed on top of a sheet of paper with the first-named inventor's contact information, for illustration purposes, wherein the coating is produced using conventional, 200-2,500 rpm prepolymer mixing during polymer synthesis (i.e., the coating shown in FIG. 1A). FIG. 2B is an optical micrograph (no magnification) of the Example 1 coating disposed on top of the same printed sheet of paper, wherein the coating is produced using tip sonication for 30 seconds during polymer synthesis (i.e., the same coating shown in FIG. 1B). The coating film thickness is 0.025 cm (250 µm) for both of FIGS. 2A and 2B.

Figure 9:
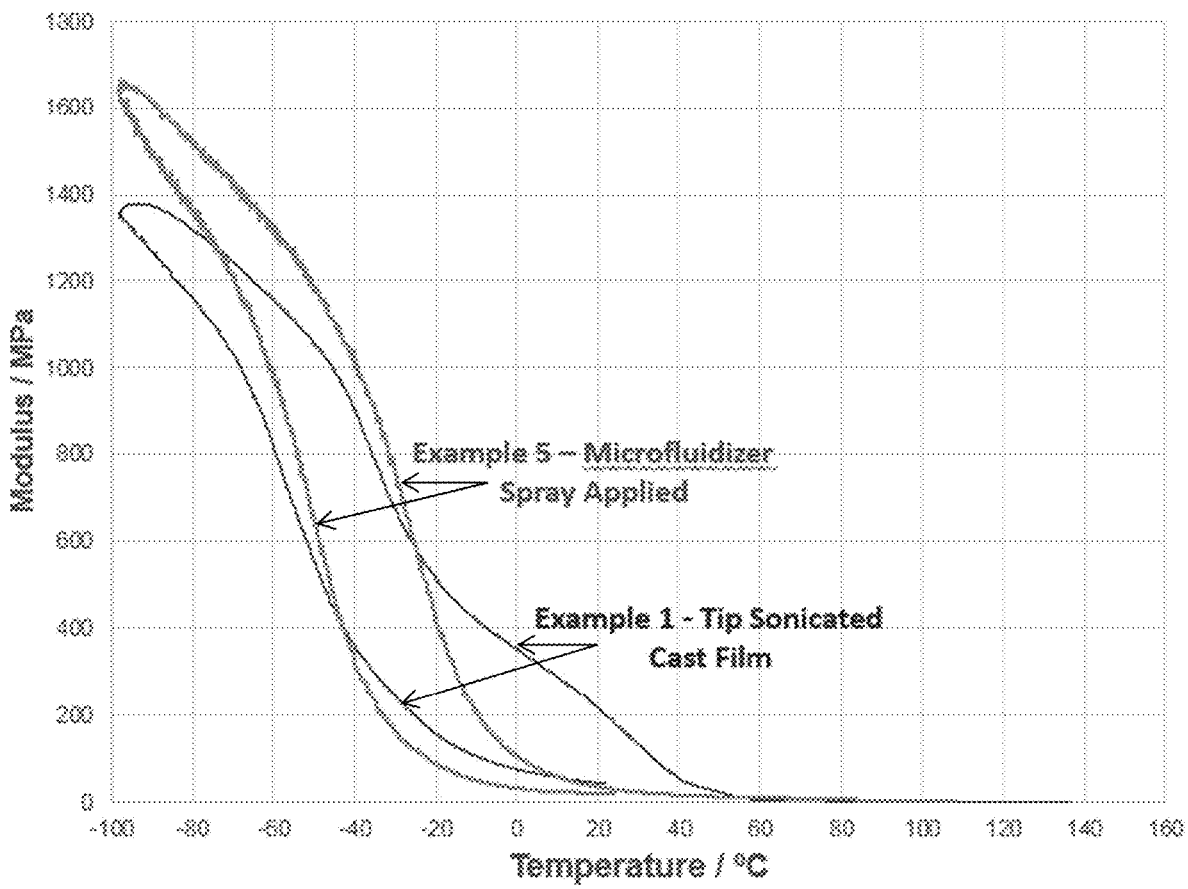
FIG. 9 is a Dynamic Mechanical Analyzer trace of modulus versus temperature for the Example 1 coating produced from a prepolymer that is tip-sonicated and cast, as well as the Example 5 coating produced from a prepolymer that is microfluidized and sprayed.

The glass-transition temperature of the Example 1 coating produced using tip sonication for 30 seconds during polymer synthesis is found to be about −50° C., discussed below at Example 5 (which is compared to this Example 1) and in reference to FIG. 9.

Example 2: Synthesis of Icephobic Coating with 36 wt % of Low-Molecular-Weight PFPE Hydroxy-terminated poly(ethylene glycol) ($M_n$=3,350 g/mol, 5 g, 1.5 mmol) is placed in a 3-neck roundbottom flask that contains an inlet for argon and is equipped with an overhead stirrer (Teflon shaft and blade). While stirring, 4,4'-methylenebis(cyclohexyl isocyanate) (3.85 g, 14.7 mmol) is added to the solution and the flask is placed in an oil bath at 100° C. Dibutyltin dilaurate (0.02 wt %) is then added to the solution using a micropipette and the reaction is allowed to proceed. After 1 hour, Fluorolink 5147x ($M_n$=2,209 g/mol, 5.73 g, 2.6 mmol) is added to the stirring solution and allowed to react for 1 hour at 100° C. The prepolymer is allowed to cool slightly before addition of n-butyl acetate (2.75 g). After the addition of n-butyl acetate, the prepolymer is mixed at 300 rpm (or generally from about 200 to 2500 rpm). Alternatively, or additionally, the prepolymer is optionally subjected to microfluidization or tip sonication (see methods above).

The chain extender 1,4-butanediol (0.98 g, 10.6 mmol) is then added to the prepolymer. The curative and prepolymer solution are combined in a plastic mixing container (Flack-Tek-speedmixer compatible) and placed in the FlackTek speedmixer at 2,300 rpm for 15 to 60 seconds. The polymer is drop-casted to form a film or diluted further to spray using an air gun, to create a polyurethane film/coating that contains about 36 wt % PFPE.

Figure 3A:
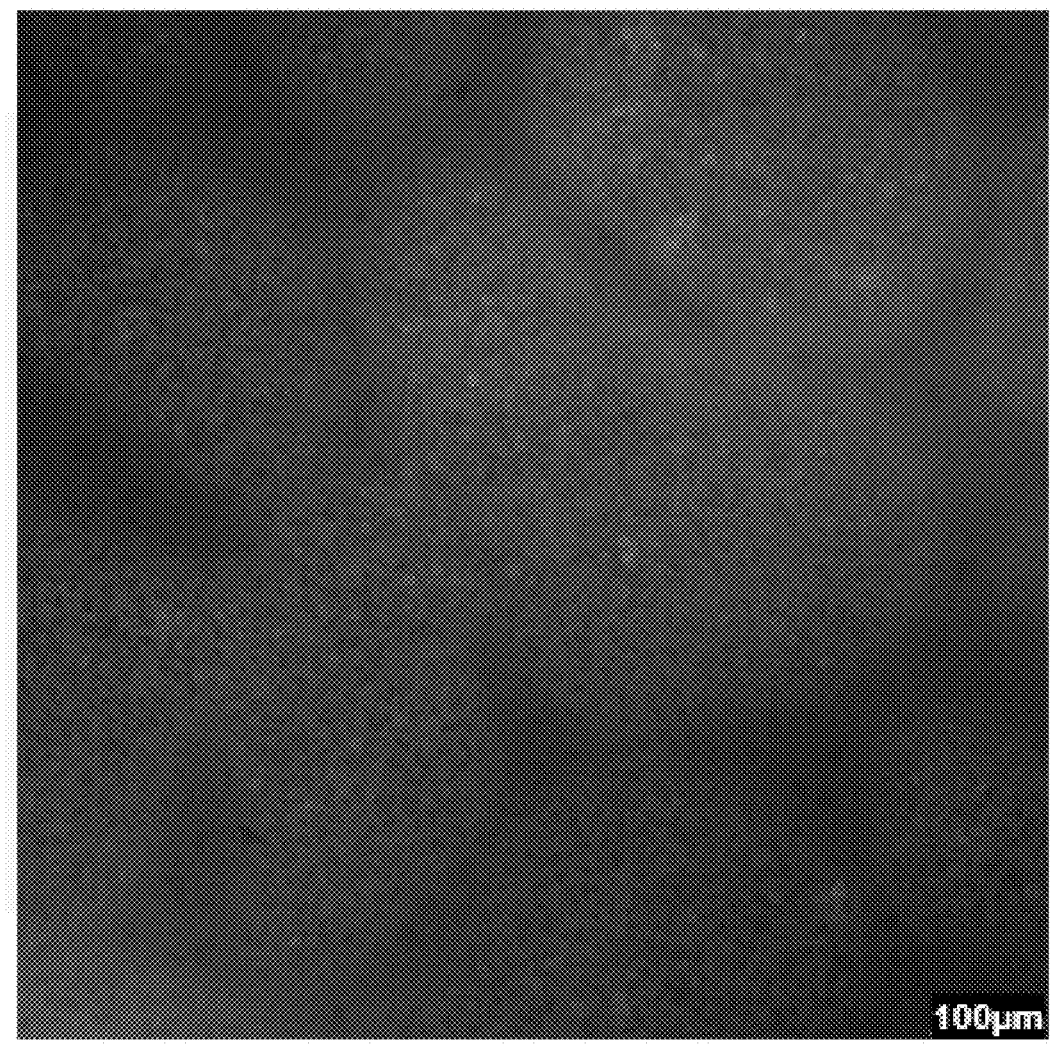
FIG. 3A is a CLSM image (scale bar 100 μm) for the Example 6 coating produced using conventional prepolymer mixing during polymer synthesis.
Figure 3B:
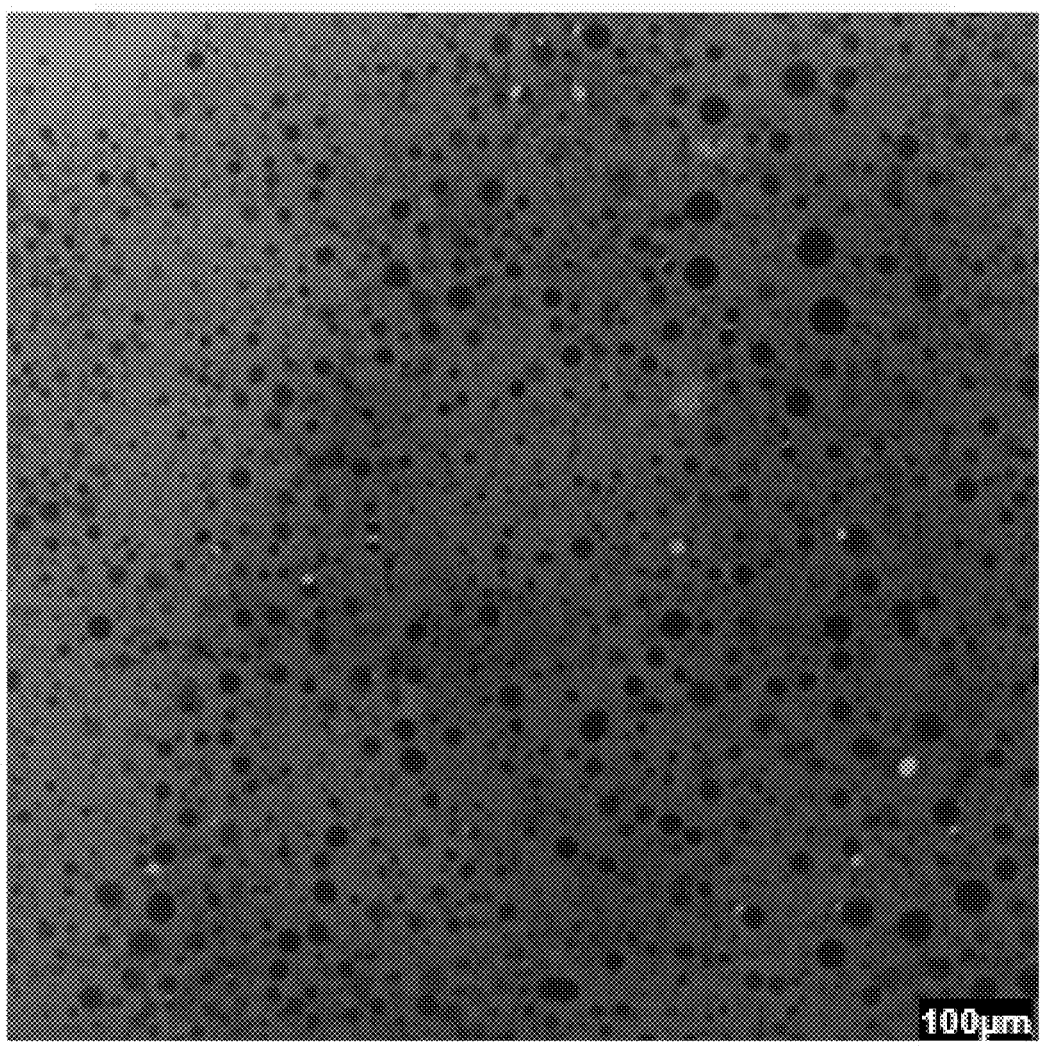
FIG. 3B is a CLSM image (scale bar 100 μm) for the Example 2 coating produced using conventional prepolymer mixing during polymer synthesis.

FIG. 3B is a confocal laser scanning microscopy (CLSM) image (scale bar 100 µm) for the Example 2 coating produced using conventional, 200-2,500 rpm prepolymer mixing during polymer synthesis. In FIG. 3B, the fluorescent regions (which display as green regions in the color drawings and lighter regions when reproduced in grayscale) are representative of hydrophilic PEG regions. The inclusions (which display as darker regions) are representative of hydrophobic fluoropolymer regions.

Example 3: Synthesis of Icephobic Coating with 50 wt % of Low-Molecular-Weight PFPE Hydroxy-terminated poly(ethylene glycol) ($M_n$=3,350 g/mol, 5 g, 1.5 mmol) is placed in a 3-neck roundbottom flask that contains an inlet for argon and is equipped with an overhead stirrer (Teflon shaft and blade). While stirring, 4,4'-methylenebis(cyclohexyl isocyanate) (3.85 g, 14.7 mmol) is added to the solution and the flask is placed in an oil bath at 100° C. Dibutyltin dilaurate (0.02 wt %) is then added to the solution using a micropipette and the reaction is allowed to proceed. After 1 hour, Fluorolink 5147x ($M_n$=2,209 g/mol, 9.8 g, 4.5 mmol) is added to the stirring solution and allowed to react for 1 hour at 100° C. The prepolymer is allowed to cool slightly before addition of n-butyl acetate (3.42 g). After the addition of n-butyl acetate, the prepolymer is mixed at 300 rpm (or generally from about 200 to 2,500 rpm). Alternatively, or additionally, the prepolymer is optionally subjected to microfluidization or tip sonication (see methods above).

The chain extender 1,4-butanediol (0.78 g, 8.7 mmol) is then added to the prepolymer. The curative and prepolymer solution are combined in a plastic mixing container (Flack-Tek-speedmixer compatible) and placed in the FlackTek speedmixer at 2,300 rpm for 15 to 60 seconds. The polymer is drop-casted to form a film or diluted further to spray using an air gun, to create a polyurethane film/coating that contains about 59 wt % PFPE.

Figure 6:
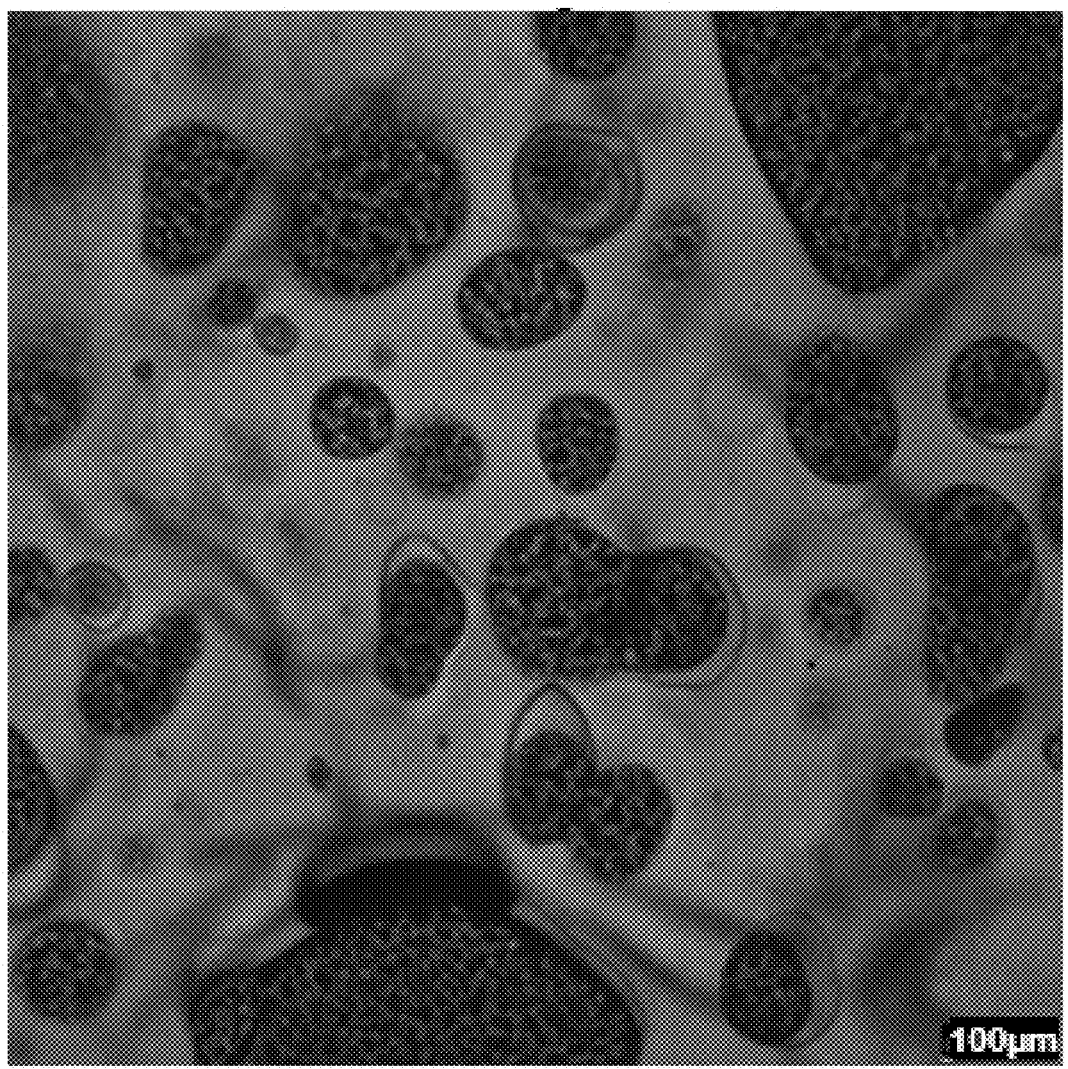
FIG. 6 is a CLSM image (scale bar 100 μm) for the Example 3 coating produced using conventional prepolymer mixing during polymer synthesis.

FIG. 6 is a confocal laser scanning microscopy (CLSM) image (scale bar 100 µm) for the Example 3 coating produced using conventional, 200-2,500 rpm prepolymer mixing during polymer synthesis. In FIG. 6, the fluorescent regions (which display as green regions in the color drawings and lighter regions when reproduced in grayscale) are representative of hydrophilic PEG regions. The inclusions (which display as darker regions) are representative of hydrophobic fluoropolymer regions.

Example 4: Synthesis of Icephobic Coating with 25 wt % of Low-Molecular-Weight PFPE Hydroxy-terminated poly(ethylene glycol) ($M_n$=3,350 g/mol, 5 g, 1.5 mmol) is placed in a 3-neck roundbottom flask that contains an inlet for argon and equipped with an overhead stirrer (Teflon shaft and blade). While stirring, 4,4'-methylenebis(cyclohexyl isocyanate) (2.05 g, 7.8 mmol) is added to the solution and the flask is placed in an oil bath at 100° C. Dibutyltin dilaurate (0.02 wt %) is then added to the solution using a micropipette and the reaction is allowed to proceed. After 1 hour, Fluorolink 5147x ($M_n$=2,209 g/mol, 2.39 g, 1.1 mmol) is added to the stirring solution and allowed to react for 1 hour at 100° C. The prepolymer is allowed to cool slightly before addition of n-butyl acetate (1.75 g). After the addition of n-butyl acetate, the prepolymer is mixed at 300 rpm (or generally from about 200 to 2,500 rpm). Alternatively, or additionally, the prepolymer is optionally subjected to microfluidization or tip sonication (see methods above).

The chain extender 1,4-butanediol (0.49 g, 5.4 mmol) is then added to the prepolymer. The curative and prepolymer solution are combined in a plastic mixing container (Flack-Tek-speedmixer compatible) and placed in the FlackTek speedmixer at 2,300 rpm for 15 to 60 seconds. The polymer is drop-casted to form a film or diluted further to spray using an air gun, to create a polyurethane film/coating that contains about 25 wt % PFPE.

Figure 7:
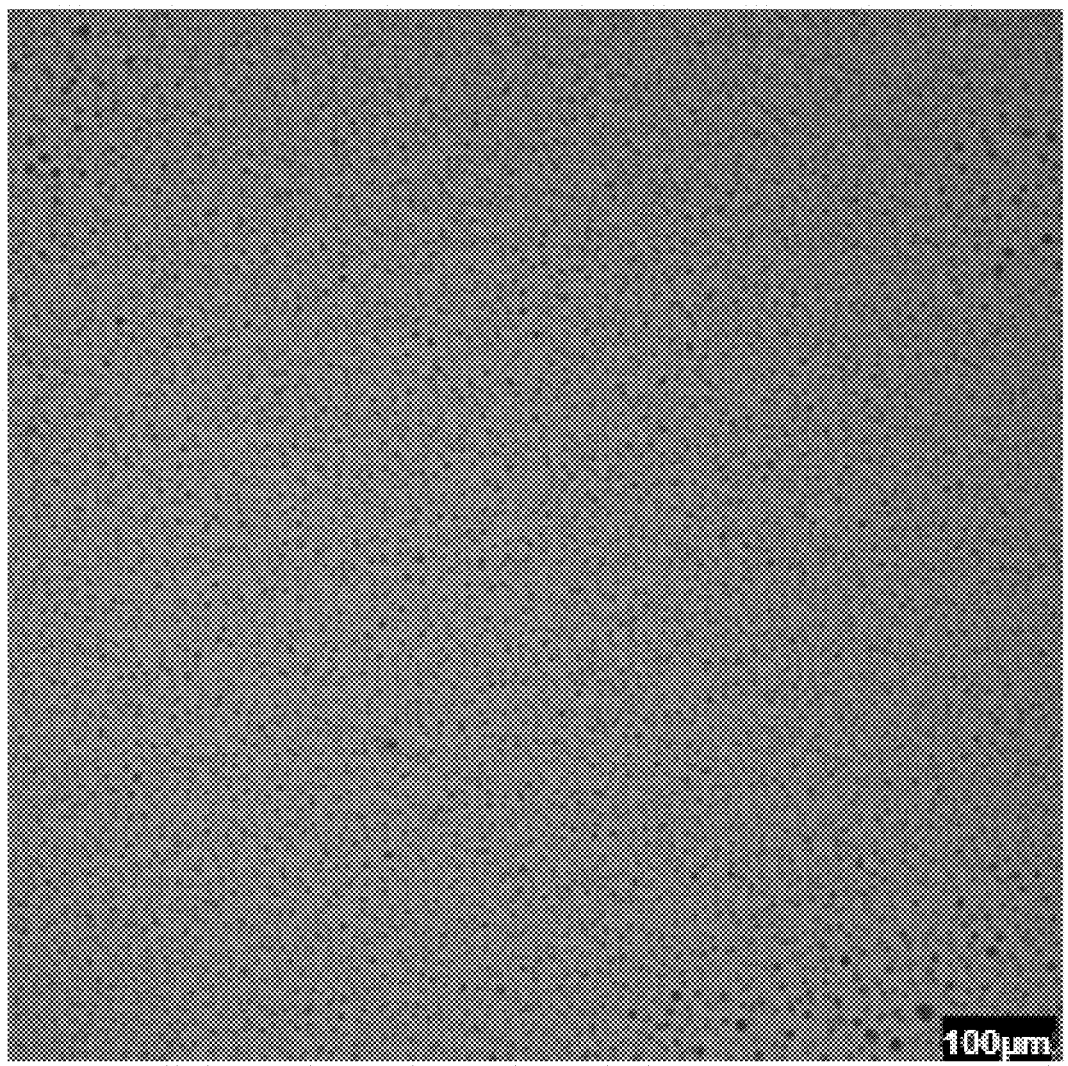
FIG. 7 is a CLSM image (scale bar 100 μm) for the Example 4 coating produced using conventional prepolymer mixing during polymer synthesis.

FIG. 7 is a confocal laser scanning microscopy (CLSM) image (scale bar 100 μm) for the Example 4 coating produced using conventional, 200-2,500 rpm prepolymer mixing during polymer synthesis. In FIG. 7, the fluorescent regions (which display as green regions in the color drawings and lighter regions when reproduced in grayscale) are representative of hydrophilic PEG regions. The inclusions (which display as darker regions) are representative of hydrophobic fluoropolymer regions.

Figure 8:
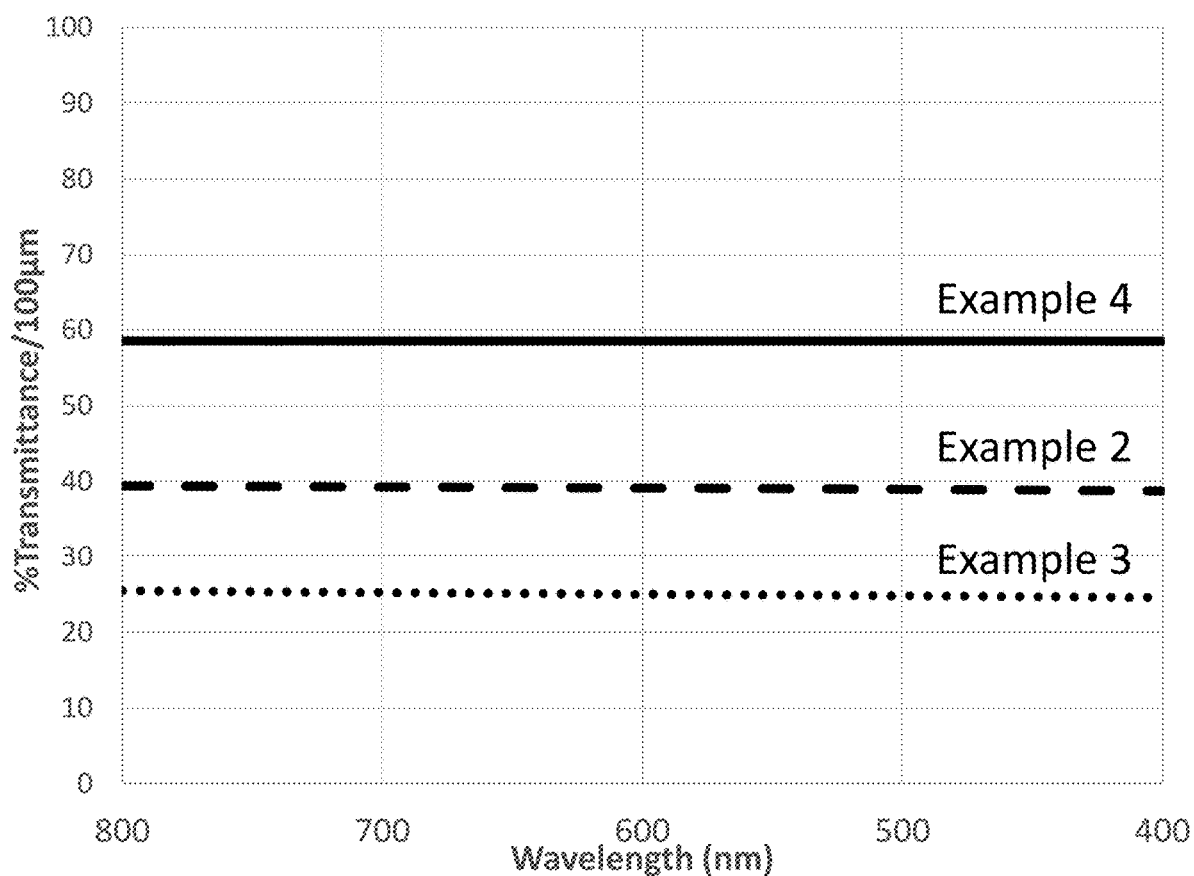
FIG. 8 is a plot of % transmittance of the Examples 2, 3, and 4 coatings produced using conventional prepolymer mixing during polymer synthesis, over wavelengths from 400 nm to 800 nm, through a 100-micron-thick sample of the coating.

FIG. 8 is a plot of % transmittance of the Examples 2, 3, and 4 coatings produced using conventional 200-2,500 rpm prepolymer mixing during polymer synthesis, over wavelengths from 400 nm to 800 nm, through a 100-micron-thick sample of the coating film. This set of examples shows the effect of different weight percent of low-molecular-weight ($M_n$=2,209 g/mol) PFPE in the cured film, on the visible absorbance. In particular, the Example 2 coating has about 40% transmittance, the Example 3 coating has about 25% transmittance, and the Example 4 coating has about 58% transmittance, all three being over 400-800 nm wavelengths through a 100-micron-thick sample.

Comparing Example 3 to Example 4, with the only difference being the final weight percent of PFPE in the cured film (50 wt % PFPE in Example 3 and 25 wt % PFPE in Example 4), it is observed that varying the fluoropolymer weight percent results in large changes in the size of the discrete domain size and resulting absorbance/scattering of light. In particular, the % transmittance of light more than doubles upon changing the fluoropolymer weight percent from 50% to 25%. The Example 4 coating is more transparent, and more translucent, compared to the Example 3 coating.

Example 5: Synthesis of Icephobic Coating with Low-Molecular-Weight PFPE and Low-Molecular Weight PEG Hydroxy-terminated poly(ethylene glycol) ($M_n$=1,000 g/mol, 3.7 g, 3.7 mmol) is placed in a 3-neck roundbottom flask that contains an inlet for argon and is equipped with an overhead stirrer (Teflon shaft and blade). While stirring, 4,4'-methylenebis(cyclohexyl isocyanate) (3.47 g, 13.2 mmol) is added to the solution and the flask is placed in an oil bath at 100° C. Dibutyltin dilaurate (0.02 wt %) is then added to the solution using a micropipette and the reaction is allowed to proceed. After 1 hour, Fluorolink 5147x ($M_n$=2,209 g/mol, 3.6 g, 1.6 mmol) is added to the stirring solution and allowed to react for 1 hour at 100° C. The prepolymer is allowed to cool slightly before addition of n-butyl acetate (2.02 g). After the addition of n-butyl acetate, the prepolymer is mixed at 300 rpm (or generally from about 200 to 2,500 rpm). Alternatively, or additionally, the prepolymer is optionally subjected to microfluidization or tip sonication (see methods above).

The chain extender 1,4-butanediol (0.73 g, 8.1 mmol) is then added to the prepolymer. The curative and prepolymer solution are combined in a plastic mixing container (Flack-Tek-speedmixer compatible) and placed in the FlackTek speedmixer at 2,300 rpm for 15 to 60 seconds. The polymer is drop-casted to form a film or diluted further to spray using an air gun, to create a polyurethane film/coating.

Figure 3C:
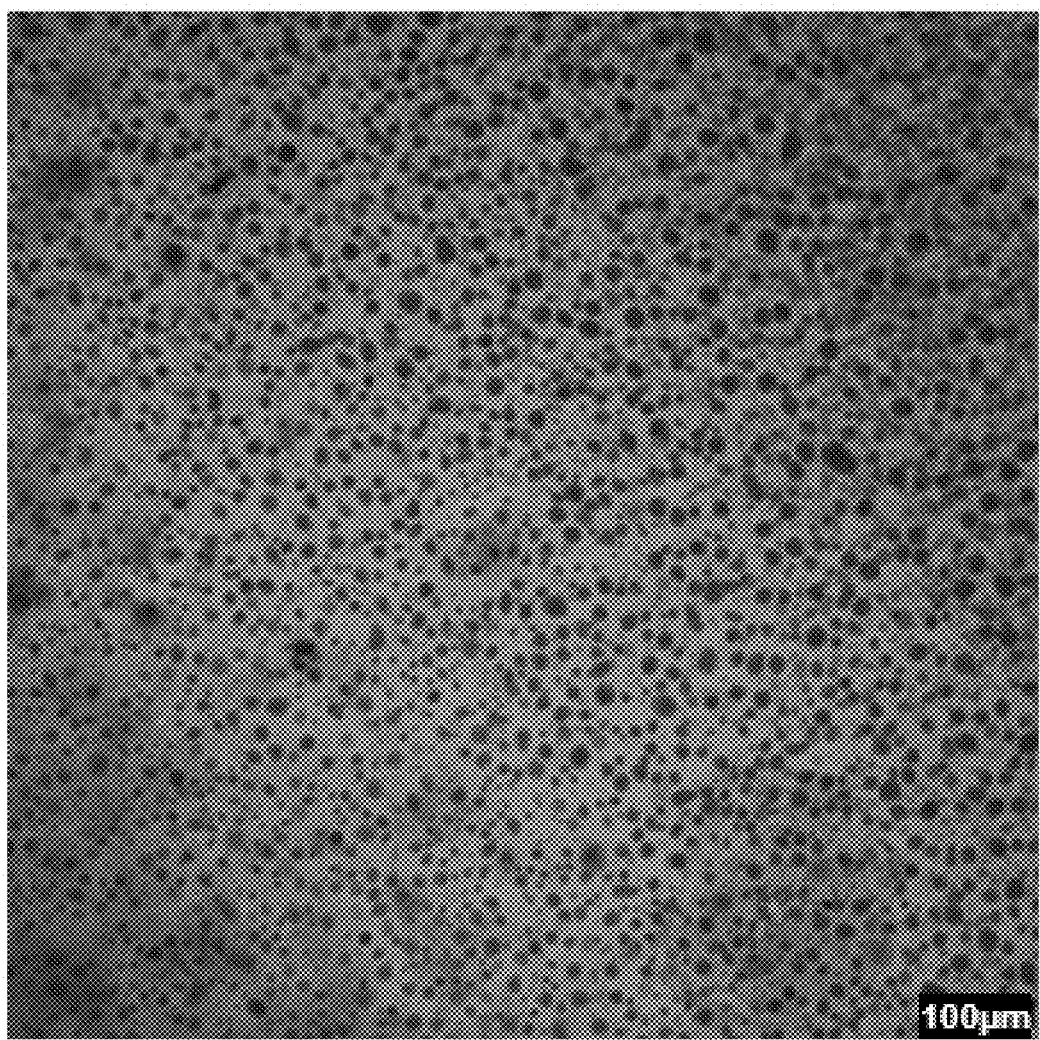
FIG. 3C is a CLSM image (scale bar 100 μm) for the Example 5 coating produced using conventional prepolymer mixing during polymer synthesis.

FIG. 3C is a confocal laser scanning microscopy (CLSM) image (scale bar 100 μm) for the Example 5 coating produced using conventional, 200-2,500 rpm prepolymer mixing during polymer synthesis. In FIG. 3C, the fluorescent regions (which display as green regions in the color drawings and lighter regions when reproduced in grayscale) are representative of hydrophilic PEG regions. The inclusions (which display as darker regions) are representative of hydrophobic fluoropolymer regions.

The prepolymer which includes both the low-molecular-weight PFPE and the low-molecular-weight PEG is separately processed using a microfluidizer and compared to an otherwise-equivalent film prepared by mixing at about 2,300 rpm. It is observed that this precursor combination is stabilized in homogenization using a microfluidizer.

Figure 4A:
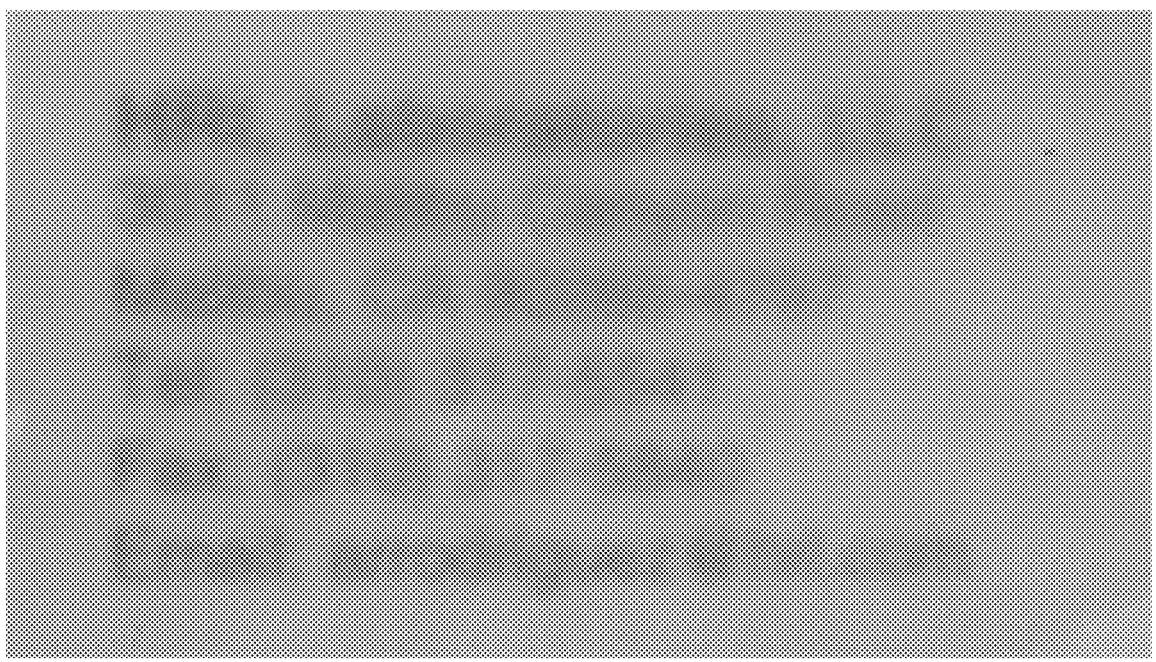
FIG. 4A is an optical micrograph of the Example 5 coating produced using conventional prepolymer mixing during polymer synthesis.
Figure 4B:
FIG. 4B is an optical micrograph of the Example 5 coating produced using microfluidization during polymer synthesis.

FIG. 4A is an optical micrograph (no magnification) of the Example 5 coating disposed on top of a sheet of paper with the first-named inventor's contact information, for illustration purposes, wherein the coating is produced using conventional, 2,300 rpm prepolymer mixing during polymer synthesis (i.e., the coating shown in FIG. 3C). FIG. 4B is an optical micrograph (no magnification) of the Example 5 coating disposed on top of the same printed sheet of paper, wherein the coating is produced using microfluidization during polymer synthesis. The coating film thickness is 0.076 cm (760 μm) for both of FIGS. 4A and 4B.

Figure 5:
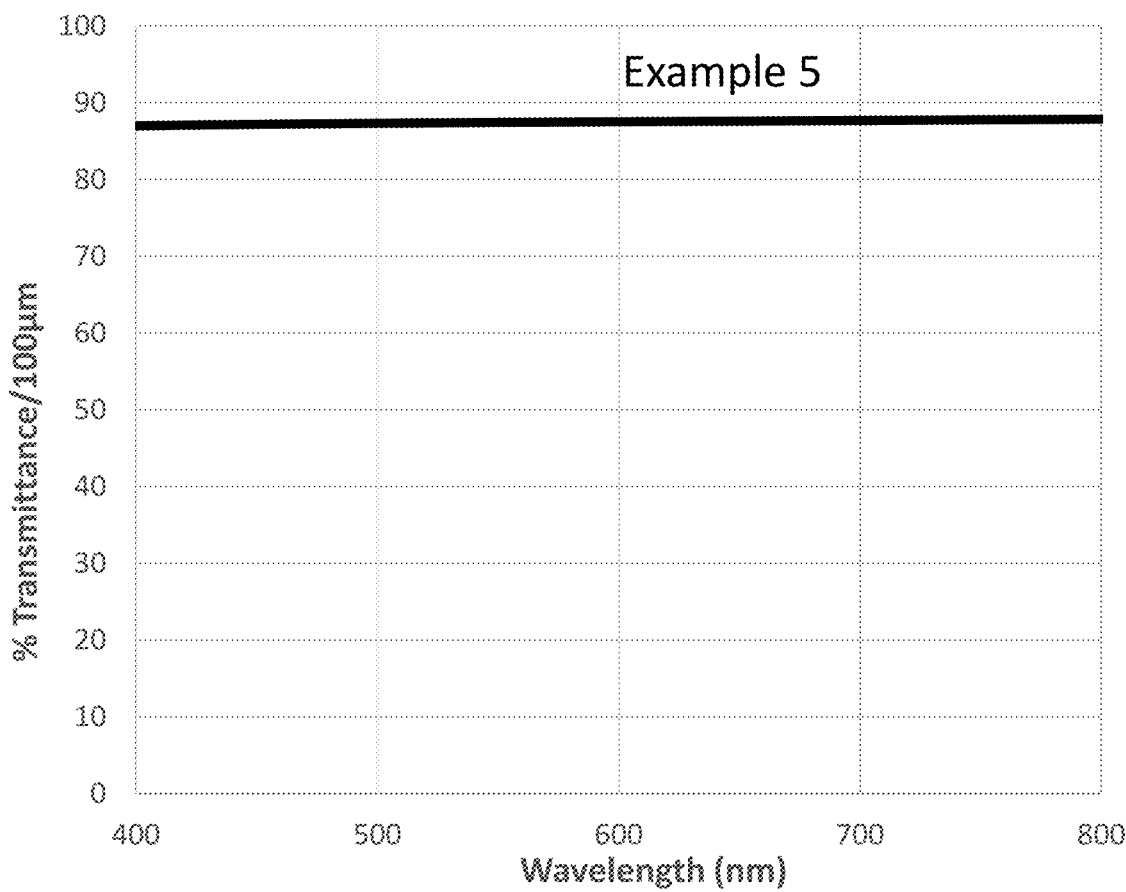
FIG. 5 is a plot of % transmittance of the Example 5 coating produced using microfluidization during polymer synthesis, over wavelengths from 400 nm to 800 nm, through a 100-micron-thick sample of the coating film.

FIG. 5 is a plot of % transmittance of the Example 5 coating produced using microfluidization during polymer synthesis, over wavelengths from 400 nm to 800 nm, through a 100-micron-thick sample of the coating film. FIG. 5 shows over 80% transmittance (about 87%) at all light wavelengths from 400 nm to 800 nm, through a 100-micron film of the transparent icephobic coating. The microfluidized prepolymer with low-molecular-weight PFPE and low-molecular-weight PEG provides excellent transparency.

While PFPE materials have glass-transition temperatures ($T_g$) typically between −90° C. and −100° C., composite materials combining PFPE and PEG display a $T_g$ considerably higher, and above −80° C. Shown in FIG. 9 is a Dynamic Mechanical Analyzer (DMA) trace of the modulus versus temperature for the Example 1 coating produced from a prepolymer that is tip-sonicated and cast, as well as the Example 5 coating produced from a prepolymer that is microfluidized and sprayed. FIG. 9 indicates an approximate $T_g$ of about −50° C. for both of these materials, much higher than any of the individual components (PFPE has $T_g$ of −90° C. to −100° C., and PEG has $T_g$ of −66° C.). This is due to the higher-$T_g$ PEG component as well as the modifying effect of the urethane/urea bonds in the hard segments between soft segments that produce a stiffening effect.

Example 6: Synthesis of Icephobic Coating with Low-Molecular Weight PEG

Hydroxy-terminated poly(ethylene glycol) ($M_n$=1000 g/mol, 6.5 g, 6.5 mmol) is placed in a 3-neck roundbottom flask that contains an inlet for argon and is equipped with an overhead stirrer (Teflon shaft and blade). While stirring, 4,4'-methylenebis(cyclohexyl isocyanate) (6.4 g, 24.6 mmol) is added to the solution and the flask is placed in an oil bath at 100° C. Dibutyltin dilaurate (0.02 wt %) is then added to the solution using a micropipette and the reaction is allowed to proceed. After 1 hour, Fluorolink D4000 ($M_n$=4,000 g/mol, 6.5 g, 1.6 mmol) is added to the stirring solution and allowed to react for 1 hour at 100° C. The prepolymer is allowed to cool slightly before addition of n-butyl acetate (3.7 g). After the addition of n-butyl acetate, the prepolymer is mixed at 300 rpm (or generally from about 200 to 2,500 rpm). The prepolymer is optionally subjected to microfluidization or tip sonication (see methods above), instead of, or in addition to, conventional mixing (200-2,500 rpm).

The chain extender 1,4-butanediol (1.5 g, 16.4 mmol) is then added to the prepolymer. The curative and prepolymer solution are combined in a plastic mixing container (FlackTek-speedmixer compatible) and placed in the FlackTek speedmixer at 2,300 rpm for 15 to 60 seconds. The polymer is drop-casted to form a film or diluted further to spray using an air gun, to create a polyurethane film/coating.

FIG. 3A is a confocal laser scanning microscopy (CLSM) image (scale bar 100 µm) for the Example 6 coating produced using conventional, 200-2,500 rpm prepolymer mixing during polymer synthesis.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method of forming a transparent icephobic coating, said method comprising:

(a) obtaining a hardenable precursor material for a transparent icephobic coating, said hardenable precursor material comprising a first component and a plurality of inclusions containing a second component, wherein one of said first component or said second component is a low-surface-energy polymer having a surface energy between about 5 mJ/m² to about 50 mJ/m², and the other of said first component or said second component is a hygroscopic material;

(b) applying mechanical shear and/or sonication to said hardenable precursor material;

(c) disposing said hardenable precursor material onto a substrate surface; and (d) curing said hardenable precursor material to form a transparent icephobic coating comprising a hardened continuous matrix containing regions of said first component separated from regions of said second component, wherein said low-surface-energy polymer and said hygroscopic material are covalently connected in a block copolymer, and wherein said regions of said first component are separated from said regions of said second component on an average length scale of phase inhomogeneity from about 10 nanometers to about 10 microns.

2. The method of claim 1, wherein step (b) comprises treating said hardenable precursor material with a high-shear apparatus selected from the group consisting of a dispersion disk-type blade, a high-pressure microfluidizer, a centrifugal mixer, and combinations thereof.

3. The method of claim 1, wherein step (b) comprises treating said hardenable precursor material with a sonication apparatus selected from the group consisting of an ultrasonic bath sonicator, a probe sonicator, sonicator horns, and combinations thereof.

4. The method of claim 1, wherein steps (b) and (c) are performed simultaneously.

5. The method of claim 1, wherein said average length scale of phase inhomogeneity is from about 10 nanometers to about 1 micron.

6. The method of claim 1, wherein said transparent icephobic coating is characterized by a light transmittance of at least 20%, at one or more wavelengths from 400 nm to 800 nm, through a 100-micron film of said transparent icephobic coating.

7. The method of claim 1, wherein said transparent icephobic coating is characterized by a light transmittance of at least 50%, at one or more wavelengths from 400 nm to 800 nm, through a 100-micron film of said transparent icephobic coating.

8. The method of claim 1, wherein said transparent icephobic coating is characterized by a light transmittance of at least 80%, at one or more wavelengths from 400 nm to 800 nm, through a 100-micron film of said transparent icephobic coating.

9. The method of claim 1, wherein said low-surface-energy polymer is a fluoropolymer.

10. The method of claim 9, wherein said fluoropolymer is a perfluoropolyether.

11. The method of claim 1, wherein said hygroscopic material is a polyester or polyether.

12. The method of claim 11, wherein said polyester or polyether is a poly(ethylene glycol).

\* \* \* \* \*